(12) United States Patent
Gammelgard et al.

(10) Patent No.: US 12,217,552 B1
(45) Date of Patent: Feb. 4, 2025

(54) METHOD AND SYSTEM FOR RECALL NOTIFICATION

(71) Applicant: STATE FARM MUTUAL AUTOMOBILE INSURANCE COMPANY, Bloomington, IL (US)

(72) Inventors: Ryan Gammelgard, Bloomington, IL (US); Justin Davis, Normal, IL (US); Karen Allen, Bloomington, IL (US); Steven Schmidt, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 591 days.

(21) Appl. No.: 17/235,495

(22) Filed: Apr. 20, 2021

Related U.S. Application Data

(60) Provisional application No. 63/150,410, filed on Feb. 17, 2021.

(51) Int. Cl.
*G07C 5/00* (2006.01)
*G06Q 10/20* (2023.01)
(Continued)

(52) U.S. Cl.
CPC ............. *G07C 5/006* (2013.01); *G06Q 10/20* (2013.01); *G07C 5/008* (2013.01); *H04L 9/3236* (2013.01); *H04L 9/50* (2022.05)

(58) Field of Classification Search
CPC .. G06Q 10/08355; G06Q 50/30; G06Q 50/10; G06Q 30/018; G06Q 30/016;
(Continued)

(56) References Cited

U.S. PATENT DOCUMENTS 9,208,526 B1    12/2015    Leise
10,049,505 B1 *   8/2018    Harvey ............... B60R 16/0234
(Continued)

OTHER PUBLICATIONS

I. P. Gomes and D. F. Wolf, "A Health Monitoring System with Hybrid Bayesian Network for Autonomous Vehicle," 2019, 19th International Conference on Advanced Robotics (ICAR), pp. 260-265. (Year: 2019).*
(Continued)

*Primary Examiner* — Sarah M Monfeldt
*Assistant Examiner* — Michael J. Monaghan
(74) *Attorney, Agent, or Firm* — MARSHALL, GERSTEIN & BORUN LLP

(57) ABSTRACT

Methods and systems for obtaining vehicle recall notifications are described herein. A vehicle having one or more autonomous operation features may receive a notification indicating that the vehicle requires a safety recall. The notification may provide identification information for a vehicle part that needs to be replaced. Additionally, the vehicle may determine whether the vehicle part is currently within the vehicle by obtaining a set of identification information for current vehicle parts within the vehicle and comparing the identification information for the vehicle part to the set of identification information for current vehicle parts within the vehicle. In response to determining that the vehicle part is currently within the vehicle, the vehicle may identify a treatment facility for replacing the vehicle part, and cause the vehicle to travel to the identified treatment facility for replacing the vehicle part.

6 Claims, 9 Drawing Sheets

(51) Int. Cl.
*H04L 9/00* (2022.01)
*H04L 9/32* (2006.01)

(58) Field of Classification Search
CPC ........ G06Q 10/20; G07C 5/006; G07C 5/008; G05D 1/0088; G05D 2201/0213; G05D 2201/0216; G05D 1/0212; G05D 1/0291; H04L 9/3236; H04L 9/50
See application file for complete search history.

(56) References Cited

U.S. PATENT DOCUMENTS

| | | | |
|---|---|---|---|
| 10,266,180 B1 | 4/2019 | Fields et al. | |
| 10,545,024 B1 | 1/2020 | Konrardy et al. | |
| 10,733,471 B1* | 8/2020 | Wilbert | G06T 11/60 |
| 10,733,648 B1 | 8/2020 | Mullen et al. | |
| 11,443,568 B1* | 9/2022 | Amireddy | H04W 4/44 |
| 2007/0094089 A1* | 4/2007 | Wilbrink | G07C 5/085 |
| | | | 340/933 |
| 2015/0235480 A1* | 8/2015 | Cudak | G06Q 10/20 |
| | | | 701/2 |
| 2016/0189115 A1* | 6/2016 | Cattone | G06Q 10/087 |
| | | | 705/26.8 |
| 2017/0278312 A1* | 9/2017 | Minster | G05D 1/0297 |
| 2018/0336424 A1* | 11/2018 | Jang | G06V 10/454 |
| 2019/0154453 A1* | 5/2019 | Leone | B60W 30/188 |
| 2019/0197177 A1* | 6/2019 | Bielby | G06N 3/045 |
| 2019/0197798 A1* | 6/2019 | Abari | G06Q 10/063 |
| 2019/0213804 A1* | 7/2019 | Zhang | G06N 5/01 |
| 2019/0227569 A1* | 7/2019 | Weslosky | G07C 5/0808 |
| 2019/0311226 A1* | 10/2019 | Xiao | G06F 18/214 |
| 2020/0143606 A1* | 5/2020 | Hoffmann | G07C 5/0816 |
| 2020/0175124 A1* | 6/2020 | Ananthapur Bache | |
| | | | G06F 30/18 |
| 2020/0202636 A1* | 6/2020 | Andres | G06Q 10/20 |
| 2021/0081698 A1* | 3/2021 | Lindeman | G06Q 30/0283 |
| 2021/0142464 A1* | 5/2021 | Tian | G06T 7/0004 |
| 2021/0287456 A1* | 9/2021 | Yezersky | H04W 4/44 |
| 2022/0042472 A1* | 2/2022 | Domingos | F01M 1/10 |
| 2022/0043459 A1* | 2/2022 | Ayers | G05D 1/0088 |

OTHER PUBLICATIONS

S. Jha et al., "ML-Based Fault Injection for Autonomous Vehicles: A Case for Bayesian Fault Injection," 2019, 49th Annual IEEE/IFIP International Conference on Dependable Systems and Networks (DSN), pp. 112-124. (Year: 2019).*

* cited by examiner

METHOD AND SYSTEM FOR RECALL NOTIFICATION

CROSS-REFERENCE TO RELATED APPLICATIONS

This application claims priority to and the benefit of the filing date of provisional U.S. Patent Application No. 63/150,410 entitled "Method and System for Recall Notification," filed on Feb. 17, 2021, the entire contents of which is hereby expressly incorporated herein by reference.

FIELD

The present disclosure generally relates to systems and methods for automatically notifying vehicles or vehicle owners when the vehicles requires a safety recall.

BACKGROUND

Typically, when a vehicle recall is issued, the vehicle manufacturer obtains a list of vehicle purchasers and/or vehicle registration information to then send notifications to the vehicle owners regarding the recall. However, the vehicle manufacturers' records may be inaccurate or may not be up-to-date, for example when a vehicle is sold to a third-party after the vehicle has been purchased from a dealership.

Vehicle part information identifying the vehicle parts in certain vehicles may be stored in centralized databases held by the vehicle manufacturers. Thus, when a vehicle recall is issued for a particular vehicle part, the vehicle manufacturers may be able to identify the vehicles having the particular vehicle part. However, the centralized databases are vulnerable to attacks from unauthorized parties attempting to access the information.

Furthermore, conventional vehicles are typically operated by a human vehicle operator who controls both steering and motive controls. Operator error, inattention, inexperience, misuse, or distraction may lead to numerous vehicle collisions each year, resulting in injury and damage.

More recently, autonomous or semi-autonomous vehicles augment vehicle operators' information or replace vehicle operators' control commands to operate the vehicle, in whole or part, with computer systems based upon information from sensors within, or attached to, the vehicle. Such vehicles may be operated with or without passengers, thus requiring different means of control than traditional vehicles. Newer vehicles may also include a plurality of advanced sensors, capable of providing significantly more data (both in type and quantity) than is available even from GPS navigation assistance systems installed in traditional vehicles.

BRIEF SUMMARY

The present embodiments may be related to a vehicle recall notification system. The embodiments described herein relate particularly to various aspects of a server computing device, such as an insurance provider server that obtains vehicle recall information. The vehicle recall information may include a list of vehicles or vehicle parts that require a safety recall. The server computing device may then identify vehicles corresponding to the vehicle recall information by (i) communicating with a distributed ledger network that records current vehicle part information for vehicles, or (ii) by retrieving a list of vehicles associated with the server computing device (e.g., a list of vehicles insured by an insurance provider operating the server computing device).

Upon identifying a vehicle corresponding to the vehicle recall information, the server computing device may obtain contact information for communicating with the vehicle or the owner of the vehicle and may transmit a recall notification via the contact information. In some scenarios, the vehicle may be an autonomous or semi-autonomous vehicle. Upon receiving the recall notification, the vehicle may identify a treatment facility (e.g., a dealership associated with the manufacturer of the vehicle) for the replacing a vehicle part due to the safety recall. The vehicle may then automatically travel to the treatment facility without input from a vehicle operator. Specific systems and methods are summarized below. The methods and systems summarized below may include additional, less, or alternate actions, including those discussed elsewhere herein.

In one aspect, a computer-implemented method of obtaining vehicle recall notifications may be provided. The method may include, via one or more local or remote processors, servers, transceivers, and/or sensors, (1) receiving, in a vehicle having one or more autonomous operation features, a notification indicating that the vehicle requires a safety recall, the notification providing identification information for a vehicle part that needs to be replaced; (2) determining whether the vehicle part is currently within the vehicle by obtaining a set of identification information for current vehicle parts within the vehicle and comparing the identification information for the vehicle part to the set of identification information for current vehicle parts within the vehicle; (3) in response to determining that the vehicle part is currently within the vehicle, identifying a treatment facility for replacing the vehicle part; and/or (4) causing the vehicle to travel to the identified treatment facility for replacing the vehicle part. The method may include additional, less, or alternate actions, including those discussed elsewhere herein.

For instance, the notification may be received from a third-party organization different from a manufacturer of the vehicle. The notification may be a first notification and the method may further include transmitting a second notification to the third-party organization indicating that the vehicle part has been replaced. Additionally, the second notification may include identification information for a replacement vehicle part installed within the vehicle for the third-party organization to maintain an up-to-date record of the vehicle parts within the vehicle.

Determining whether the vehicle part is currently within the vehicle may include obtaining the set of identification information for at least one of: installed components within the vehicle, after-market components installed within the vehicle, or a type of on-board computer within the vehicle. The set of identification may be obtained from a database within the on-board computer or by communicating with the installed or after-market components within the vehicle. Additionally or alternatively, the set of identification may be obtained by capturing images of the vehicle and identifying current vehicle parts within the vehicle using object recognition techniques.

Systems or computer-readable media storing instructions for implementing all or part of the system described above may also be provided in some aspects. Systems for implementing such methods may include one or more of the following: a special-purpose assessment computing device, a mobile computing device, an on-board computer, a remote server, one or more sensors, one or more communication modules configured to communicate wirelessly via radio links, radio frequency links, and/or wireless communication channels, and/or one or more program memories coupled to one or more processors of the mobile computing device, on-board computer, or remote server. Such program memories may store instructions to cause the one or more processors to implement part or all of the method described above. Additional or alternative features described herein below may be included in some aspects.

In another aspect, a computer-implemented method for identifying vehicles requiring safety recalls using a distributed ledger may be provided. The method may include, via one or more local or remote processors, servers, sensors, and/or associated transceivers, (1) receiving, by a third-party organization, identification information for a vehicle part that needs to be replaced due to a safety recall; (2) monitoring a distributed ledger that records current vehicle part information for a plurality of vehicles to identify vehicles associated with the third-party organization having the vehicle part that needs to be replaced, wherein the distributed ledger is maintained by a plurality of participants in a distributed ledger network according to a set of consensus rules; (3) in response to identifying a vehicle associated with the third-party organization having the vehicle part that needs to be replaced, identifying contact information associated with the vehicle; and/or (4) transmitting, via the contact information, a notification indicating that the identified vehicle requires a safety recall. The method may include additional, less, or alternate actions and functionality, including that discussed elsewhere him.

For instance, the method may include after a threshold time period, monitoring the distributed ledger to identify remaining vehicles associated with the third-party organization still having the vehicle part that needs to be replaced; and/or determining a completion percentage for the safety recalls based upon the remaining vehicles associated with the third-party organization still having the vehicle part that needs to be replaced.

Additionally, the method may include providing an indication of the completion percentage to a client device for display on a user interface. Moreover, the method may include receiving, from a vehicle manufacturer, identification information for a set of vehicles requiring safety recalls; and/or comparing the identified vehicles from the distributed ledger to the set of vehicles from the vehicle manufacturer to verify that the set of vehicles from the vehicle manufacturer require safety recalls.

Still further, the method may include in response to determining that one of the identified vehicles from the distributed ledger is not included in the set of vehicles from the vehicle manufacturer, communicating with the vehicle manufacturer to provide the vehicle manufacturer with identification information for the identified vehicle not included in the set of vehicles and to determine a reason for the identified vehicle not being included in the set of vehicles from the vehicle manufacturer.

Upon receiving a replacement part, an update may be broadcasted to the distributed ledger indicating the replacement part installed within the vehicle. Each time a vehicle part is replaced within a vehicle of the plurality of vehicles, a transaction may be broadcasted to the distributed ledger indicating up-to-date vehicle part information for the vehicle for the distributed ledger to maintain up-to-date records of vehicle parts within the plurality of vehicles.

Systems or computer-readable media storing instructions for implementing all or part of the system described above may also be provided in some aspects. Systems for implementing such methods may include one or more of the following: a special-purpose assessment computing device, a mobile computing device, an on-board computer, a remote server, one or more local or remote sensors, one or more communication modules configured to communicate wirelessly via radio links, radio frequency links, and/or wireless communication channels, and/or one or more program memories coupled to one or more processors of the mobile computing device, on-board computer, or remote server. Such program memories may store instructions to cause the one or more processors to implement part or all of the method described above. Additional or alternative features described herein below may be included in some aspects.

In yet another aspect, a computer-implemented method for transmitting vehicle recall notifications may be provided. The method may include (1) obtaining, by one or more processors (and/or associated transceivers or sensors) for a third-party organization from a vehicle manufacturer, identification information for a first set of vehicles requiring safety recalls; (2) comparing, by the one or more processors, the identification information for the first set of vehicles to identification information for a second set of vehicles associated with the third-party organization; (3) in response to identifying a match between the first and second sets of vehicles, identifying, by the one or more processors, contact information for the matching vehicle; (4) transmitting, by the one or more processors via the contact information, a notification for display via a user interface of a client device associated with the matching vehicle indicating that the matching vehicle requires a safety recall; (5) after a threshold time period, receiving, by the one or more processors from the vehicle manufacturer, identification information for an updated first set of vehicles which have not been recalled; (6) determining, by the one or more processors, a completion percentage for the safety recalls based upon the updated first set of vehicles which have not been recalled and the second set of vehicles associated with the third-party organization; and/or (7) providing, by the one or more processors, an indication of the completion percentage for display. The method may include additional, less, or alternate actions, including those discussed elsewhere herein.

For instance, the method may include in response to determining that a vehicle identified in one of the received second notifications is not included in the updated first set of vehicles from the vehicle manufacturer, communicating, by the one or more processors, with the vehicle manufacturer to provide the vehicle manufacturer with identification information for the identified vehicle not included in the updated first set of vehicles.

The notification may be a first notification, and the method may further include receiving, by the one or more processors, a second notification indicating that the vehicle part has been replaced. The second notification may be received from at least one of: the matching vehicle, the client device, or a treatment facility that replaced the vehicle part. Moreover, the second notification may include identification information for a replacement vehicle part installed within the matching vehicle for the third-party organization to maintain an up-to-date record of the vehicle parts within the matching vehicle.

Additionally, the completion percentage may be determined based upon the updated first set of vehicles from the vehicle manufacturer and received second notifications from matching vehicles, client devices, or treatment facilities.

Systems or computer-readable media storing instructions for implementing all or part of the system described above may also be provided in some aspects. Systems for implementing such methods may include one or more of the following: a special-purpose assessment computing device, a mobile computing device, an on-board computer, a remote server, one or more local or remote sensors, one or more communication modules configured to communicate wirelessly via radio links, radio frequency links, and/or wireless communication channels, and/or one or more program memories coupled to one or more processors of the mobile computing device, on-board computer, or remote server. Such program memories may store instructions to cause the one or more processors to implement part or all of the method described above. Additional or alternative features described herein below may be included in some aspects.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

The systems and methods disclosed herein generally relate to vehicle recall notifications. In some scenarios, the recall notifications are communicated to vehicles having autonomous operation features, components, and software. Assessment of components and features may be performed as part of determining whether the vehicle requires a recall, detecting malfunctions, determining repairs, determining component operating status, or generally evaluating effectiveness or reliability of components and features. To this end, the systems and methods may include collecting, communicating, evaluating, predicting, and/or utilizing data associated with autonomous or semi-autonomous operation features for controlling a vehicle.

The autonomous operation features may take full control of the vehicle under certain conditions, viz. fully autonomous operation, or the autonomous operation features may assist the vehicle operator in operating the vehicle, viz. partially autonomous operation. Fully autonomous operation features may include systems within the vehicle that pilot the vehicle to a destination with or without a vehicle operator present (e.g., an operating system for a driverless car). Partially autonomous operation features may assist the vehicle operator in limited ways (e.g., automatic braking or collision avoidance systems). Fully or partially autonomous operation features may perform specific functions to control or assist in controlling some aspect of vehicle operation, or such features may manage or control other autonomous operation features. For example, a vehicle operating system may control numerous subsystems that each fully or partially control aspects of vehicle operation. In some embodiments, a fully autonomous operation feature may become a partially autonomous operation feature when the fully autonomous operation feature or a component associated with the fully autonomous operation feature malfunctions.

Exemplary Autonomous Vehicle Operation System

Figure 1A:
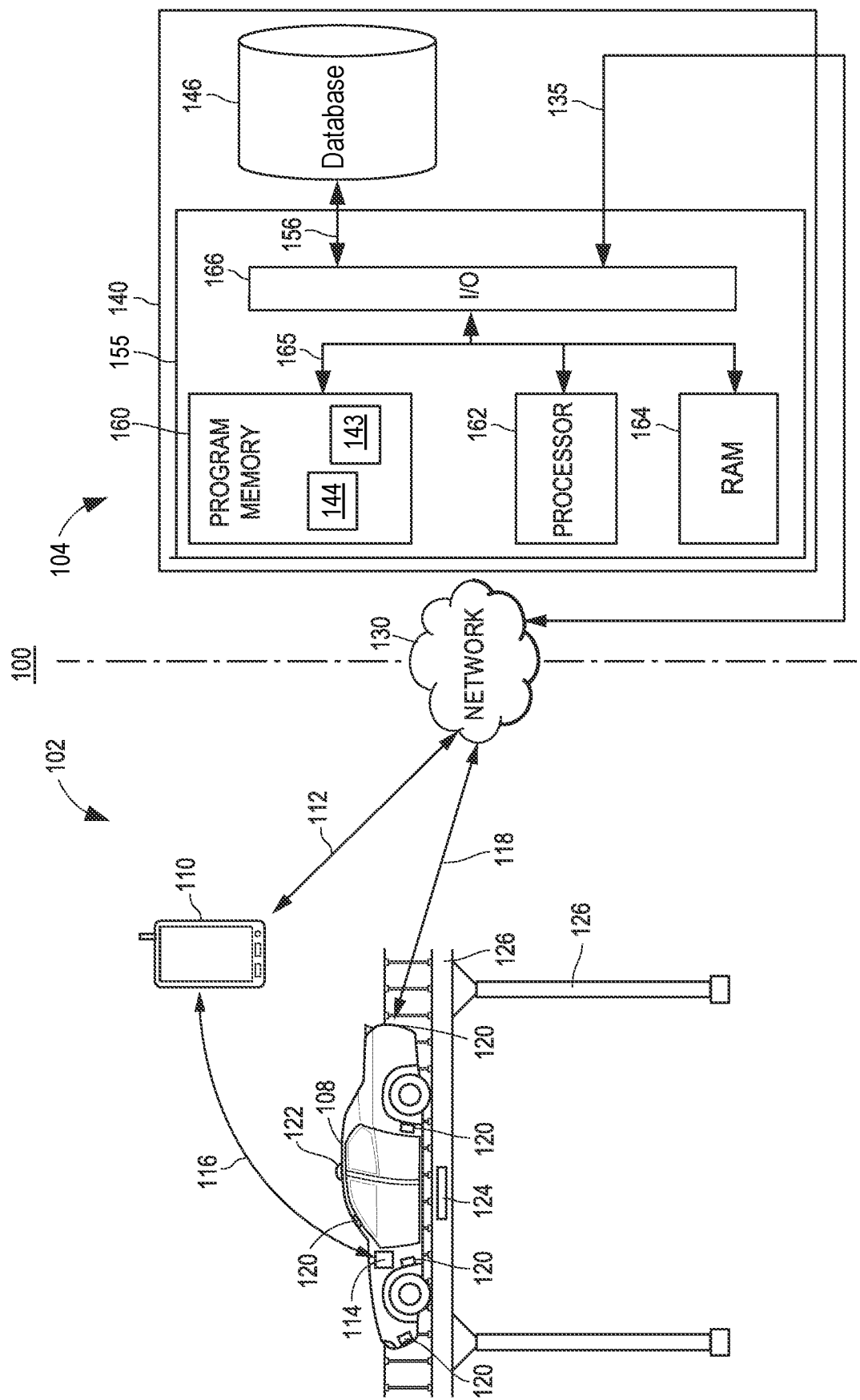
FIG. 1A illustrates a block diagram of an exemplary autonomous vehicle data system for autonomous vehicle operation, monitoring, communication, and related functions.

FIG. 1A illustrates a block diagram of an exemplary autonomous vehicle data system 100, which may be a portion of a recall notification communication system, as described in more detail below with reference to FIG. 1B. The high-level architecture includes both hardware and software applications, as well as various data communications channels for communicating data between the various hardware and software components. The autonomous vehicle data system 100 may be roughly divided into front-end components 102 and back-end components 104. The front-end components 102 may obtain information regarding a vehicle 108 (e.g., a car, truck, motorcycle, etc.) and the surrounding environment. An on-board computer 114 may utilize this information to operate the vehicle 108 according to an autonomous operation feature or to assist the vehicle operator in operating the vehicle 108.

To monitor the vehicle 108, the front-end components 102 may include one or more sensors 120 and/or installed within the vehicle 108 that may communicate with the on-board computer 114. The front-end components 102 may further process the sensor data using the on-board computer 114 or a mobile device 110 (e.g., a smart phone, a tablet computer, a special purpose computing device, smart watch, wearable electronics, etc.) to determine when the vehicle is in operation and information regarding the vehicle.

In some embodiments of the system 100, the front-end components 102 may communicate with the back-end components 104 via a network 130. Either the on-board computer 114 or the mobile device 110 may communicate with the back-end components 104 via the network 130 to allow the back-end components 104 to record information regarding vehicle usage. The back-end components 104 may use one or more servers 140 to receive data from the front-end components 102, store the received data, process the received data, and/or communicate information associated with the received or processed data.

The front-end components 102 may be disposed within or communicatively connected to one or more on-board computers 114, which may be permanently or removably installed in the vehicle 108. The on-board computer 114 may interface with the one or more sensors 120 within the vehicle 108 (e.g., a digital camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, etc.), which sensors may also be incorporated within or connected to the on-board computer 114.

The front end components 102 may further include a communication component 122 to transmit information to and receive information from external sources, including other vehicles, infrastructure, or the back-end components 104. In some embodiments, the mobile device 110 may supplement the functions performed by the on-board computer 114 described herein by, for example, sending or receiving information to and from the server 140 via the network 130, such as over one or more radio frequency links or wireless communication channels. In other embodiments, the on-board computer 114 may perform all of the functions of the mobile device 110 described herein, in which case no mobile device 110 may be present in the system 100.

Either or both of the mobile device 110 or on-board computer 114 may communicate with the network 130 over links 112 and 118, respectively. Either or both of the mobile device 110 or on-board computer 114 may run a Data Application for collecting, generating, processing, analyzing, transmitting, receiving, and/or acting upon data associated with the vehicle 108 (e.g., sensor data, autonomous operation feature settings, or control decisions made by the autonomous operation features) or the vehicle environment (e.g., other vehicles operating near the vehicle 108). Additionally, the mobile device 110 and on-board computer 114 may communicate with one another directly over link 116.

The mobile device 110 may be either a general-use personal computer, cellular phone, smart phone, tablet computer, smart watch, wearable electronics, or a dedicated vehicle monitoring or control device. Although only one mobile device 110 is illustrated, it should be understood that a plurality of mobile devices 110 may be used in some embodiments. The on-board computer 114 may be a general-use on-board computer capable of performing many functions relating to vehicle operation or a dedicated computer for autonomous vehicle operation. Further, the on-board computer 114 may be installed by the manufacturer of the vehicle 108 or as an aftermarket modification or addition to the vehicle 108. In some embodiments or under certain conditions, the mobile device 110 or on-board computer 114 may function as thin-client devices that outsource some or most of the processing to the server 140.

The sensors 120 may be removably or fixedly installed within the vehicle 108 and may be disposed in various arrangements to provide information to the autonomous operation features. Among the sensors 120 may be included one or more of a GPS unit, a radar unit, a LIDAR unit, an ultrasonic sensor, an infrared sensor, an inductance sensor, a camera, an accelerometer, a tachometer, or a speedometer. Some of the sensors 120 (e.g., radar, LIDAR, or camera units) may actively or passively scan the vehicle environment for obstacles (e.g., other vehicles, buildings, pedestrians, etc.), roadways, lane markings, signs, or signals. Other sensors 120 (e.g., GPS, accelerometer, or tachometer units) may provide data for determining the location or movement of the vehicle 108. Other sensors 120 may be directed to the interior or passenger compartment of the vehicle 108, such as cameras, microphones, pressure sensors, thermometers, or similar sensors to monitor the vehicle operator and/or passengers within the vehicle 108. Information generated or received by the sensors 120 may be communicated to the on-board computer 114 or the mobile device 110 for use in autonomous vehicle operation.

In further embodiments, the front-end components may include an infrastructure communication device 124 for monitoring the status of one or more infrastructure components 126. Infrastructure components 126 may include roadways, bridges, traffic signals, gates, switches, crossings, parking lots or garages, toll booths, docks, hangars, or other similar physical portions of a transportation system's infrastructure. The infrastructure communication device 124 may include or be communicatively connected to one or more sensors (not shown) for detecting information relating to the condition of the infrastructure component 126. The sensors (not shown) may generate data relating to weather conditions, traffic conditions, or operating status of the infrastructure component 126.

The infrastructure communication device 124 may be configured to receive the sensor data generated and determine a condition of the infrastructure component 126, such as weather conditions, road integrity, construction, traffic, available parking spaces, etc. The infrastructure communication device 124 may further be configured to communicate information to vehicles 108 via the communication component 122. In some embodiments, the infrastructure communication device 124 may receive information from one or more vehicles 108, while, in other embodiments, the infrastructure communication device 124 may only transmit information to the vehicles 108. The infrastructure communication device 124 may be configured to monitor vehicles 108 and/or communicate information to other vehicles 108 and/or to mobile devices 110.

In some embodiments, the communication component 122 may receive information from external sources, such as other vehicles or infrastructure. The communication component 122 may also send information regarding the vehicle 108 to external sources. To send and receive information, the communication component 122 may include a transmitter and a receiver designed to operate according to predetermined specifications, such as the dedicated short-range communication (DSRC) channel, wireless telephony, Wi-Fi, or other existing or later-developed communications protocols. The received information may supplement the data received from the sensors 120 to implement the autonomous operation features. For example, the communication component 122 may receive information that an autonomous vehicle ahead of the vehicle 108 is reducing speed, allowing the adjustments in the autonomous operation of the vehicle 108.

In addition to receiving information from the sensors 120, the on-board computer 114 may directly or indirectly control the operation of the vehicle 108 according to various autonomous operation features. The autonomous operation features may include software applications or modules implemented by the on-board computer 114 to generate and implement control commands to control the steering, braking, or throttle of the vehicle 108. To facilitate such control, the on-board computer 114 may be communicatively connected to control components of the vehicle 108 by various electrical or electromechanical control components (not shown). When a control command is generated by the on-board computer 114, it may thus be communicated to the control components of the vehicle 108 to effect a control action. In embodiments involving fully autonomous vehicles, the vehicle 108 may be operable only through such control components (not shown). In other embodiments, the control components may be disposed within or supplement other vehicle operator control components (not shown), such as steering wheels, accelerator or brake pedals, or ignition switches.

In some embodiments, the front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these. The network 130 may include one or more radio frequency communication links, such as wireless communication links 112 and 118 with mobile devices 110 and on-board computers 114, respectively. Where the network 130 comprises the Internet, data communications may take place over the network 130 via an Internet communication protocol.

The back-end components 104 include one or more servers 140. Each server 140 may include one or more computer processors adapted and configured to execute various software applications and components of the autonomous vehicle data system 100, in addition to other software applications. The server 140 may further include a database 146, which may be adapted to store data related to the operation of the vehicle 108 and its autonomous operation features. Such data might include, for example, dates and times of vehicle use, duration of vehicle use, use and settings of autonomous operation features, information regarding control decisions or control commands generated by the autonomous operation features, speed of the vehicle 108, RPM or other tachometer readings of the vehicle 108, lateral and longitudinal acceleration of the vehicle 108, vehicle accidents, incidents or near collisions of the vehicle 108, hazardous or anomalous conditions within the vehicle operating environment (e.g., construction, accidents, etc.), communication between the autonomous operation features and external sources, environmental conditions of vehicle operation (e.g., weather, traffic, road condition, etc.), errors or failures of autonomous operation features, or other data relating to use of the vehicle 108 and the autonomous operation features, which may be uploaded to the server 140 via the network 130. The server 140 may access data stored in the database 146 when executing various functions and tasks associated with the evaluating feature effectiveness or assessing risk relating to an autonomous vehicle.

Although the autonomous vehicle data system 100 is shown to include one vehicle 108, one mobile device 110, one on-board computer 114, and one server 140, it should be understood that different numbers of vehicles 108, mobile devices 110, on-board computers 114, and/or servers 140 may be utilized. For example, the system 100 may include a plurality of servers 140 and hundreds or thousands of mobile devices 110 or on-board computers 114, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information as well as periodic uploads and downloads of information. This may in turn support a thin-client embodiment of the mobile device 110 or on-board computer 114 discussed herein.

The server 140 may have a controller 155 that is operatively connected to the database 146 via a link 156. It should be noted that, while not shown, additional databases may be linked to the controller 155 in a known manner. For example, separate databases may be used for various types of information, such as autonomous operation feature information, vehicle accidents, road conditions, vehicle insurance policy information, or vehicle use information. Additional databases (not shown) may be communicatively connected to the server 140 via the network 130, such as databases maintained by third parties (e.g., weather, construction, or road network databases). The controller 155 may include a program memory 160, a processor 162 (which may be called a microcontroller or a microprocessor), a random-access memory (RAM) 164, and an input/output (I/O) circuit 166, all of which may be interconnected via an address/data bus 165.

It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. The controller 155 may also be operatively connected to the network 130 via a link 135.

The server 140 may further include a number of software applications stored in a program memory 160. The various software applications on the server 140 may include an autonomous operation information monitoring application 141 for receiving information regarding the vehicle 108 and its autonomous operation features (which may include control commands or decisions of the autonomous operation features), a feature evaluation application 142 for determining the effectiveness of autonomous operation features under various conditions and/or determining operating condition of autonomous operation features or components, a real-time communication application 143 for communicating information regarding vehicle or environmental conditions between a plurality of vehicles, a navigation application 144 for assisting autonomous or semi-autonomous vehicle operation, and an accident detection application 145 for identifying accidents and providing assistance. The various software applications may be executed on the same computer processor or on different computer processors.

Figure 1B:
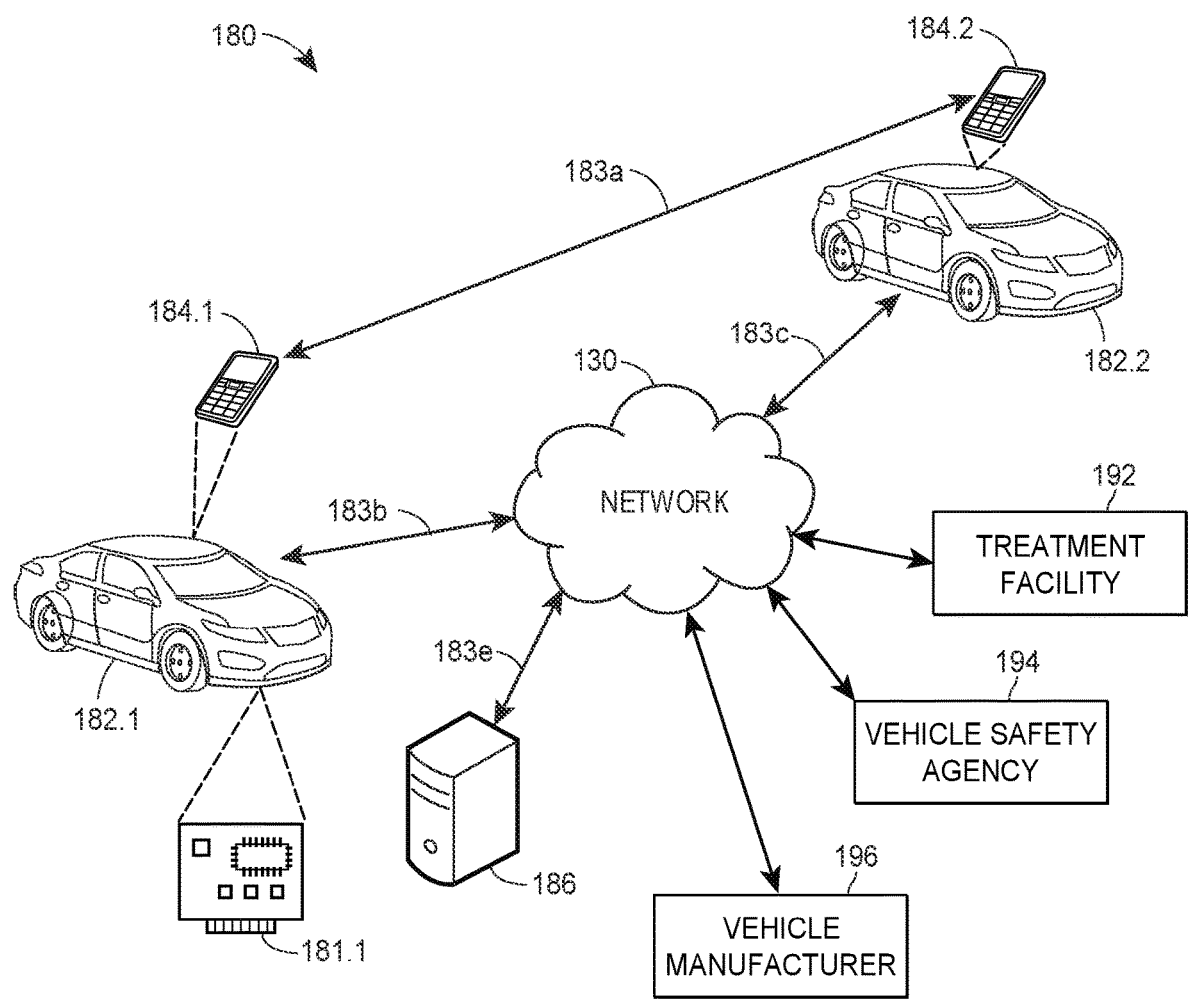
FIG. 1B illustrates a block diagram of an exemplary communication system, showing a plurality of vehicles, network servers, and/or computing devices for vehicle manufacturers, third-party insurance providers, treatment facilities, and/or vehicle safety agencies.

FIG. 1B illustrates a block diagram of an exemplary recall notification communication system 180 on which the exemplary computer-implemented methods described herein may be implemented. In one aspect, system 180 may include a network 130, N number of vehicles 182.1-182.N and respective mobile computing devices 184.1-184.N, an external computing device 186, a treatment facility 192, a vehicle safety agency 194, and/or a vehicle manufacturer 196. In one aspect, mobile computing devices 184 may be an implementation of mobile computing device 110, while vehicles 182 may be an implementation of vehicle 108. The vehicles 182 may include a plurality of vehicles 108 having autonomous operation features, as well as a plurality of other vehicles not having autonomous operation features. As illustrated, the vehicle 182.1 may include a vehicle controller 181.1, which may be an on-board computer 114 as discussed elsewhere herein, while vehicle 182.2 may lack such a component. Each of vehicles 182.1 and 182.2 may be configured for wireless inter-vehicle communication, such as vehicle-to-vehicle (V2V) wireless communication and/or data transmission via the communication component 122, directly via the mobile computing devices 184, or otherwise.

Although system 180 is shown in FIG. 1B as including one network 130, two mobile computing devices 184.1 and 184.2, two vehicles 182.1 and 182.2, one external computing device 186, one treatment facility 192, one vehicle safety agency 194, and/or one vehicle manufacturer 196, various embodiments of system 180 may include any suitable number of networks 130, mobile computing devices 184, vehicles 182, external computing devices 186, treatment facilities 192, vehicle safety agencies 194, and/or vehicle manufacturers 196. The vehicles 182 included in such embodiments may include any number of vehicles 182.*i* having vehicle controllers 181.*i* (such as vehicle 182.1 with vehicle controller 181.1) and vehicles 182.*j* not having vehicles controllers (such as vehicle 182.2). Moreover, system 180 may include a plurality of external computing devices 186 and more than two mobile computing devices 184, any suitable number of which being interconnected directly to one another and/or via network 130.

In one aspect, each of mobile computing devices 184.1 and 184.2 may be configured to communicate with one another directly via peer-to-peer (P2P) wireless communication and/or data transfer. In other aspects, each of mobile computing devices 184.1 and 184.2 may be configured to communicate indirectly with one another and/or any suitable device via communications over network 130, such as external computing device 186, for example. In still other aspects, each of mobile computing devices 184.1 and 184.2 may be configured to communicate directly and/or indirectly with other suitable devices, which may include synchronous or asynchronous communication.

Each of mobile computing devices 184.1 and 184.2 may be configured to send data to and/or receive data from one another and/or via network 130 using one or more suitable communication protocols, which may be the same communication protocols or different communication protocols. For example, mobile computing devices 184.1 and 184.2 may be configured to communicate with one another via a direct radio link 183*a*, which may utilize, for example, a Wi-Fi direct protocol, an ad-hoc cellular communication protocol, etc. Mobile computing devices 184.1 and 184.2 may also be configured to communicate with vehicles 182.1 and 182.2, respectively, utilizing a BLUETOOTH communication protocol (radio link not shown).

In some embodiments, this may include communication between a mobile computing device 184.1 and a vehicle controller 181.1. In other embodiments, it may involve communication between a mobile computing device 184.2 and a vehicle telephony, entertainment, navigation, or information system (not shown) of the vehicle 182.2 that provides functionality other than autonomous (or semi-autonomous) vehicle control. Thus, vehicles 182.2 without autonomous operation features may nonetheless be connected to mobile computing devices 184.2 in order to facilitate communication, information presentation, or similar non-control operations (e.g., navigation display, hands-free telephony, or music selection and presentation).

To provide additional examples, mobile computing devices 184.1 and 184.2 may be configured to communicate with one another via radio links 183*b* and 183*c* by each communicating with network 130 utilizing a cellular communication protocol. As an additional example, mobile computing devices 184.1 and/or 184.2 may be configured to communicate with external computing device 186 via radio links 183*b*, 183*c*, and/or 183*e*. Similarly, one or more vehicle controllers 181.1 may be configured to communicate directly to the network 130 (via radio link 183*b*) or indirectly through mobile computing device 184.1 (via radio link 183*b*). Vehicle controllers 181.1 may also communicate with other vehicle controllers and/or mobile computing devices 184.2 directly or indirectly through mobile computing device 184.1 via local radio links 183*a*. As discussed elsewhere herein, network 130 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 183*a*-183*e* may represent wired links, wireless links, or any suitable combination thereof. For example, the link 183*e* may include a wired link to the network 130, in addition to, or instead of, wireless radio connections.

In some embodiments, the external computing device 186 may mediate communication between the mobile computing devices 184.1 and 184.2 based upon location or other factors. In embodiments in which mobile computing devices 184.1 and 184.2 communicate directly with one another in a peer-to-peer fashion, network 130 may be bypassed and thus communications between mobile computing devices 184.1 and 184.2 and external computing device 186 may be unnecessary. For example, in some aspects, mobile computing device 184.1 may broadcast geographic location data and/or telematics data directly to mobile computing device 184.2. In this case, mobile computing device 184.2 may operate independently of network 130 to determine operating data, risks associated with operation, control actions to be taken, and/or alerts to be generated at mobile computing device 184.2 based upon the geographic location data, sensor data, and/or the autonomous operation feature data. In accordance with such aspects, network 130 and external computing device 186 may be omitted.

However, in other aspects, one or more of mobile computing devices 184.1 and/or 184.2 may work in conjunction with external computing device 186 to determine operating data, risks associated with operation, control actions to be taken, and/or alerts to be generated. For example, in some aspects, mobile computing device 184.1 may broadcast geographic location data and/or autonomous operation feature data, which is received by external computing device 186. In this case, external computing device 186 may be configured to determine whether the same or other information should be sent to mobile computing device 184.2 based upon the geographic location data, autonomous operation feature data, or data derived therefrom.

Mobile computing devices 184.1 and 184.2 may be configured to execute one or more algorithms, programs, applications, etc., to receive recall notifications, determine if the respective vehicles 182.1 and 182.2 require recalls, and/or transmit status updates regarding whether the recall has been performed. Such functionality may, in some embodiments be controlled in whole or part by a Data Application operating on the mobile computing devices 184, as discussed elsewhere herein. Such Data Application may communicate between the mobile computing devices 184 and one or more external computing devices 186 (such as servers 140) to facilitate centralized data collection and/or processing.

In some embodiments, the Data Application may facilitate control of a vehicle 182 by a user, such as by selecting vehicle destinations and/or routes along which the vehicle 182 will travel. The Data Application may further be used to establish restrictions on vehicle use or store user preferences for vehicle use, such as in a user profile. In further embodiments, the Data Application may monitor vehicle operation or sensor data in real-time to make recommendations or for other purposes as described herein. The Data Application may further facilitate monitoring and/or assessment of the vehicle 182, such as by evaluating operating data to determine the condition of the vehicle or components thereof (e.g., sensors, autonomous operation features, etc.). Moreover, the Data Application may present recall notifications including identification information for a vehicle part that needs to be replaced, may transmit status updates indicating a current status of the recall, and may transmit updated vehicle part information when a replacement part has been installed in the vehicle 182.

External computing device 186 may be configured to execute various software applications, algorithms, and/or other suitable programs. External computing device 186 may be implemented as any suitable type of device to facilitate the functionality as described herein. For example, external computing device 186 may be a server 140 as discussed elsewhere herein. As another example, the external computing device 186 may be another computing device associated with an operator or owner of a vehicle 182, such as a desktop or notebook computer. Although illustrated as a single device in FIG. 1B, one or more portions of external computing device 186 may be implemented as one or more storage devices that are physically co-located with external computing device 186, or as one or more storage devices utilizing different storage locations as a shared database structure (e.g. cloud storage).

In some embodiments, external computing device 186 may be configured to perform any suitable portion of the processing functions remotely that have been outsourced by one or more of mobile computing devices 184.1 and/or 184.2 (and/or vehicle controllers 181.1). For example, mobile computing device 184.1 and/or 184.2 may collect data (e.g., geographic location data and/or telematics data) as described herein, but may send the data to external computing device 186 for remote processing instead of processing the data locally. In such embodiments, external computing device 186 may receive and process the data to determine whether an anomalous condition exists and, if so, whether to send an alert notification to one or more mobile computing devices 184.1 and 184.2 or take other actions.

In one aspect, external computing device 186 may additionally or alternatively be part of an insurer computing system (or facilitate communications with an insurer computer system), and as such may access insurer databases, execute algorithms, execute applications, access remote servers, communicate with remote processors, etc., as needed to perform insurance-related functions. Such insurance-related functions may include assisting insurance customers in evaluating autonomous operation features, limiting manual vehicle operation based upon risk levels, providing information regarding risk levels associated with autonomous and/or manual vehicle operation along routes, and/or determining repair/salvage information for damaged vehicles. For example, external computing device 186 may obtain a list of vehicles requiring recalls from a vehicle manufacturer 196.

External computing device 186 may then compare the list to a list of vehicles insured by the insurer and identify the insured vehicles that require recalls. Then external computing device 186 may identify contact information associated with the insured vehicles that require recalls and transmit notifications to the vehicles or vehicle owners via the contact information. In another example, external computing device 186 may facilitate the receipt of autonomous operation or other data from one or more mobile computing devices 184.1-184.N, which may each be running a Data Application to obtain such data from autonomous operation features or sensors 120 associated therewith.

In aspects in which external computing device 186 facilitates communications with an insurer computing system (or is part of such a system), data received from one or more mobile computing devices 184.1-184.N may include user credentials, which may be verified by external computing device 186 or one or more other external computing devices, servers, etc. These user credentials may be associated with an insurance profile, which may include, for example, insurance policy numbers, a description and/or listing of insured assets, vehicle identification numbers of insured vehicles, addresses of insured structures, contact information, premium rates, discounts, etc. In this way, data received from one or more mobile computing devices 184.1-184.N may allow external computing device 186 to uniquely identify each insured customer and/or whether each identified insurance customer has installed the Data Application. In addition, external computing device 186 may facilitate the communication of the updated insurance policies, premiums, rates, discounts, etc., to insurance customers for their review, modification, and/or approval—such as via wireless communication or data transmission to one or more mobile computing devices 184.1-184.N.

In some aspects, external computing device 186 may facilitate indirect communications between one or more of mobile computing devices 184, and/or vehicles 182 via network 130 or another suitable communication network, wireless communication channel, and/or wireless link.

Treatment facility 192 may include a computing device similar to external computing device 186, and may transmit status updates regarding a recall for a vehicle. The status updates may indicate that the recall is in progress, the recall has been completed, etc. Furthermore, the status updates may indicate the old vehicle part which was replaced due to the recall and the new vehicle replacement part which was installed in the vehicle due to the recall.

In some embodiments, the treatment facility 192 may transmit the status updates and/or vehicle part information for a vehicle 182 to the external computing device 186. In other embodiments, the treatment facility 192 may transmit the status updates and/or vehicle part information for a vehicle 182 to a distributed ledger as described in more detail below. In some embodiments, the treatment facility may be a dealership associated with the vehicle manufacturer 196 of the vehicle 182.

Vehicle safety agency 194 may be a private or public organization that monitors the safety of vehicles and/or vehicle parts, such as the National Highway Traffic Safety Administration (NHTSA). Vehicle safety agency 194 may include a computing device similar to external computing device 186, and may transmit identification information for vehicles or vehicle parts that require a recall. Vehicle safety agency 194 may transmit the identification information to the vehicle manufacturer 196, external computing device 186, the vehicles 182, and/or a distributed ledger.

Vehicle manufacturer 196 may include a computing device similar to external computing device 186, and may transmit a list of vehicles or vehicle parts requiring recalls to external computing device 186, the vehicles 182, or a distributed ledger.

Figure 2:
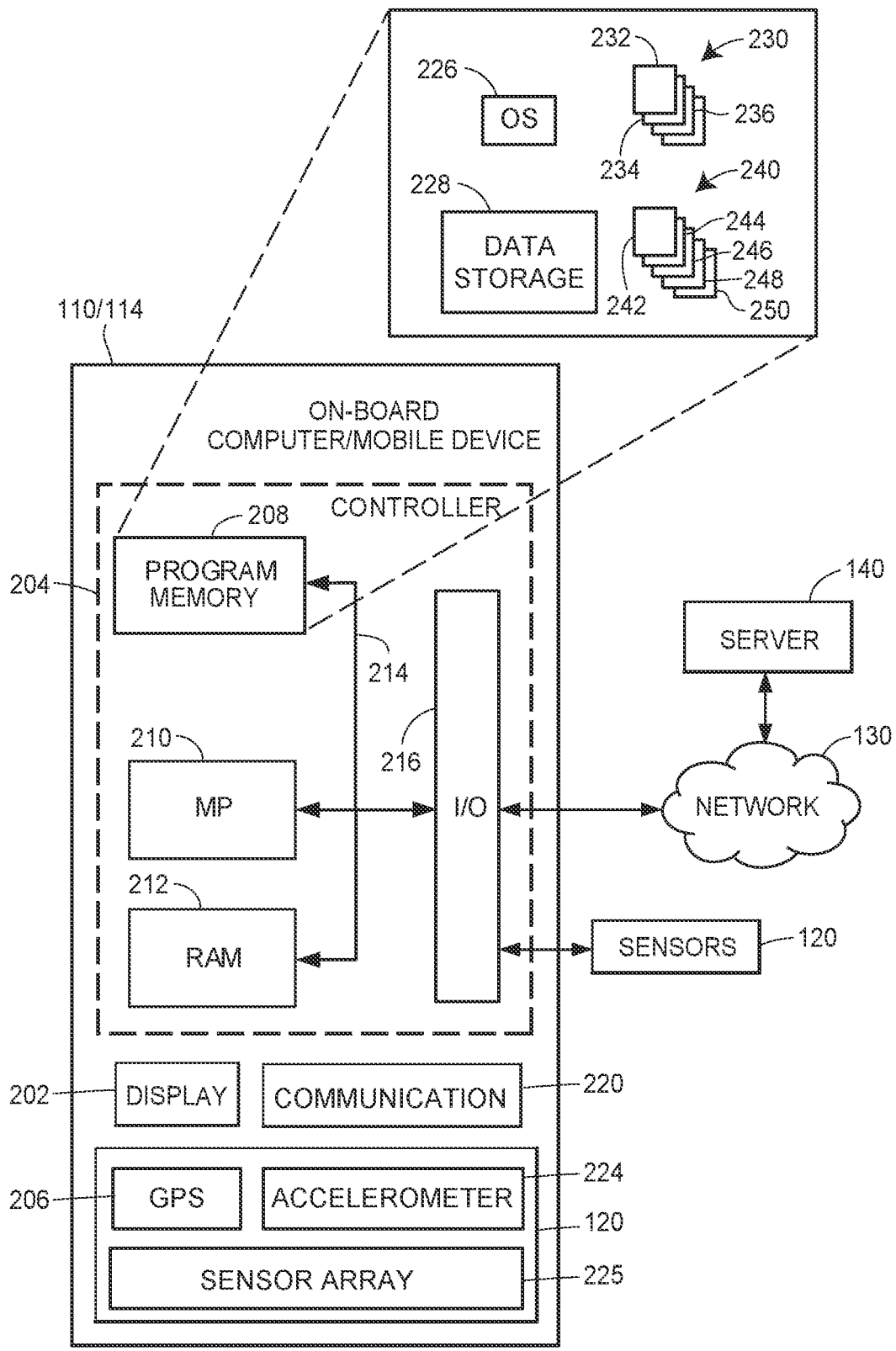
FIG. 2 illustrates a block diagram of an exemplary on-board computer or mobile device.

FIG. 2 illustrates a block diagram of an exemplary mobile device 110 or an exemplary on-board computer 114 consistent with the system 100 and the system 180. The mobile device 110 or on-board computer 114 may include a display 202, a GPS unit 206, a communication unit 220, an accelerometer 224, one or more additional sensors (not shown), a user-input device (not shown), and/or, like the server 140, a controller 204. In some embodiments, the mobile device 110 and on-board computer 114 may be integrated into a single device, or either may perform the functions of both. The on-board computer 114 (or mobile device 110) interfaces with the sensors 120 to receive information regarding the vehicle 108 and its environment, which information is used by the autonomous operation features to operate the vehicle 108.

Similar to the controller 155, the controller 204 may include a program memory 208, one or more microcontrollers or microprocessors (MP) 210, a RAM 212, and an I/O circuit 216, all of which are interconnected via an address/data bus 214. The program memory 208 includes an operating system 226, a data storage 228, a plurality of software applications 230, and/or a plurality of software routines 240. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for autonomous vehicle operation using the on-board computer 114. The data storage 228 may include data such as user profiles and preferences, application data for the plurality of applications 230, routine data for the plurality of routines 240, and other data related to the autonomous operation features. In some embodiments, the controller 204 may also include, or otherwise be communicatively connected to, other data storage mechanisms (e.g., one or more hard disk drives, optical storage drives, solid state storage devices, etc.) that reside within the vehicle 108.

As discussed with reference to the controller 155, it should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The one or more processors 210 may be adapted and configured to execute any of one or more of the plurality of software applications 230 or any one or more of the plurality of software routines 240 residing in the program memory 204, in addition to other software applications. One of the plurality of applications 230 may be an autonomous vehicle operation application 232 that may be implemented as a series of machine-readable instructions for performing the various tasks associated with implementing one or more of the autonomous operation features according to the autonomous vehicle operation method 300, described further below. Another of the plurality of applications 230 may be an autonomous communication application 234 that may be implemented as a series of machine-readable instructions for transmitting and receiving autonomous operation information to or from external sources via the communication module 220. Still another application of the plurality of applications 230 may include an autonomous operation monitoring application 236 that may be implemented as a series of machine-readable instructions for sending information regarding autonomous operation of the vehicle to the server 140 via the network 130. The Data Application for collecting, generating, processing, analyzing, transmitting, receiving, and/or acting upon autonomous operation feature data may also be stored as one of the plurality of applications 230 in the program memory 208 of the mobile computing device 110 or on-board computer 114, which may be executed by the one or more processors 210 thereof.

The plurality of software applications 230 may call various of the plurality of software routines 240 to perform functions relating to autonomous vehicle operation, monitoring, or communication. One of the plurality of software routines 240 may be a configuration routine 242 to receive settings from the vehicle operator to configure the operating parameters of an autonomous operation feature. Another of the plurality of software routines 240 may be a sensor control routine 244 to transmit instructions to a sensor 120 and receive data from the sensor 120. Still another of the plurality of software routines 240 may be an autonomous control routine 246 that performs a type of autonomous control, such as collision avoidance, lane centering, or speed control. In some embodiments, the autonomous vehicle operation application 232 may cause a plurality of autonomous control routines 246 to determine control actions required for autonomous vehicle operation.

Similarly, one of the plurality of software routines 240 may be a monitoring and reporting routine 248 that transmits information regarding autonomous vehicle operation to the server 140 via the network 130. Yet another of the plurality of software routines 240 may be a recall notification routine 250 for receiving recall notifications and providing status updates regarding a recall. Any of the plurality of software applications 230 may be designed to operate independently of the software applications 230 or in conjunction with the software applications 230.

When implementing the exemplary autonomous vehicle operation method 300, the controller 204 of the on-board computer 114 may implement the autonomous vehicle operation application 232 to communicate with the sensors 120 to receive information regarding the vehicle 108 and its environment and process that information for autonomous operation of the vehicle 108. In some embodiments including external source communication via the communication component 122 or the communication unit 220, the controller 204 may further implement the autonomous communication application 234 to receive information for external sources, such as other autonomous vehicles, smart infrastructure (e.g., electronically communicating roadways, traffic signals, or parking structures), or other sources of relevant information (e.g., weather, traffic, local amenities). Some external sources of information may be connected to the controller 204 via the network 130, such as the server 140 or internet-connected third-party databases (not shown). Although the autonomous vehicle operation application 232 and the autonomous communication application 234 are shown as two separate applications, it should be understood that the functions of the autonomous operation features may be combined or separated into any number of the software applications 230 or the software routines 240.

In addition to connections to the sensors 120 that are external to the mobile device 110 or the on-board computer 114, the mobile device 110 or the on-board computer 114 may include additional sensors 120, such as the GPS unit 206 or the accelerometer 224, which may provide information regarding the vehicle 108 for autonomous operation and other purposes. Such sensors 120 may further include one or more sensors of a sensor array 225, which may include, for example, one or more cameras, accelerometers, gyroscopes, magnetometers, barometers, thermometers, proximity sensors, light sensors, Hall Effect sensors, etc. The one or more sensors of the sensor array 225 may be positioned to determine telematics data regarding the speed, force, heading, and/or direction associated with movements of the vehicle 108.

Furthermore, the communication unit 220 may communicate with other autonomous vehicles, infrastructure, or other external sources of information to transmit and receive information relating to autonomous vehicle operation. The communication unit 220 may communicate with the external sources via the network 130 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. Furthermore, the communication unit 220 may provide input signals to the controller 204 via the I/O circuit 216. The communication unit 220 may also transmit sensor data, device status information, control signals, or other output from the controller 204 to one or more external sensors within the vehicle 108, mobile devices 110, on-board computers 114, or servers 140.

The mobile device 110 or the on-board computer 114 may include a user-input device (not shown) for receiving instructions or information from the vehicle operator, such as settings relating to an autonomous operation feature. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

Data Application

The mobile device 110 and/or on-board computer 114 may run a Data Application to collect, transmit, receive, and/or process autonomous operation feature data. Such autonomous operation feature data may include data directly generated by autonomous operation features, such as control commands used in operating the vehicle 108. Similarly, such autonomous operation feature data may include shadow control commands generated by the autonomous operation features but not actually used in operating the vehicle, such as may be generated when the autonomous operation features are disabled. The autonomous operation feature data may further include non-control data generated by the autonomous operation features, such as determinations regarding environmental conditions in the vehicle operating environment in which the vehicle 108 operates (e.g., traffic conditions, construction locations, pothole locations, worn lane markings, corners with obstructed views, etc.).

The autonomous operation feature data may yet further include sensor data generated by (or derived from sensor data generated by) sensors 120 utilized by the autonomous operation features. For example, data from LIDAR and ultrasonic sensors may be used by vehicles for autonomous operation. Such data captures a much more detailed and complete representation of the conditions in which the vehicle 108 operates than traditional vehicle operation metrics (e.g., miles driven) or non-autonomous telematics data (e.g., acceleration, position, and time).

Autonomous operation feature data may be processed and used by the Data Application to determine information regarding the vehicle 108, its operation, or its operating environment. The autonomous operation feature data may further be communicated by the Data Application to a server 140 via network 130 for processing and/or storage. In some embodiments, the autonomous operation feature data (or information derived therefrom) may be transmitted directly via radio links 183 or indirectly via network 130 from the vehicle 108 to other vehicles (or to mobile devices 110). By communicating information associated with the autonomous operation feature data to other nearby vehicles, the other vehicles or their operators may make use of such data for routing, control, or other purposes.

This may be particularly valuable in providing detailed information regarding a vehicle environment (e.g., traffic, accidents, flooding, ice, etc.) collected by a Data Application of an autonomous vehicle 108 to a driver of a non-autonomous vehicle via a Data Application of a mobile device 110 associated with the driver. For example, ice patches may be identified by an autonomous operation feature of a vehicle controller 181.1 of vehicle 182.1 and transmitted via the Data Application operating in the mobile computing device 184.1 over the network 130 to the mobile computing device 184.2, where a warning regarding the ice patches may be presented to the driver of vehicle 182.2. As another example, locations of emergency vehicles or accidents may be determined and communicated between vehicles 182, such as between an autonomous vehicle 182.1 and a traditional (non-autonomous) vehicle 182.2.

In further embodiments, a Data Application may serve as an interface between the user and an autonomous vehicle 108, via the user's mobile device 110 and/or the vehicle's on-board computer 114. The user may interact with the Data Application to locate, retrieve, park, control, or monitor the vehicle 108. For example, the Data Application may be used to select a destination and route the vehicle 108 to the destination, which may include controlling the vehicle to travel to the destination in a fully autonomous mode.

In some embodiments, the Data Application may further determine and/or provide information regarding the vehicle 108, such as the operating status or condition of autonomous operation features, sensors, or other vehicle components (e.g., tire pressure). In yet further embodiments, the Data Application may be configured to assess risk levels associated with vehicle operation based upon location, autonomous operation feature use (including settings), operating conditions, or other factors. Such risk assessment may be further used in recommending autonomous feature use levels, generating warnings to a vehicle operator, or adjusting an insurance policy associated with the vehicle 108. In other embodiments, the Data Application may receive and present recall notifications for the vehicle 108 and/or vehicle parts within the vehicle. The Data Application may also transmit status updates regarding the recall, such as "Recall in Progress," "Recall Complete," "Recall Not Necessary—The Vehicle Does Not Contain The Recalled Vehicle Part," etc. Additionally, the Data Application may transmit vehicle part information for a replacement part installed within the vehicle as a result of the recall.

Data Applications may be installed and running on a plurality of mobile devices 110 and/or on-board computers 114 in order to facilitate data sharing and other functions as described herein. Additionally, such Data Applications may provide data to, and receive data from, one or more servers 140. For example, a Data Application running on a user's mobile device 110 may communicate location data to a server 140 via the network 130. The server 140 may then process the data to determine a route, risk level, recommendation, or other action. The server 140 may then communicate the determined information to the mobile device 110 and/or on-board computer 114, which may cause the vehicle 108 to operate in accordance with the determined information (e.g., travel along a determined optimal route). Thus, the Data Application may facilitate data communication between the front-end components 102 and the back-end components 104, allowing more efficient processing and data storage.

Exemplary Autonomous Vehicle Operation Method

Figure 3:
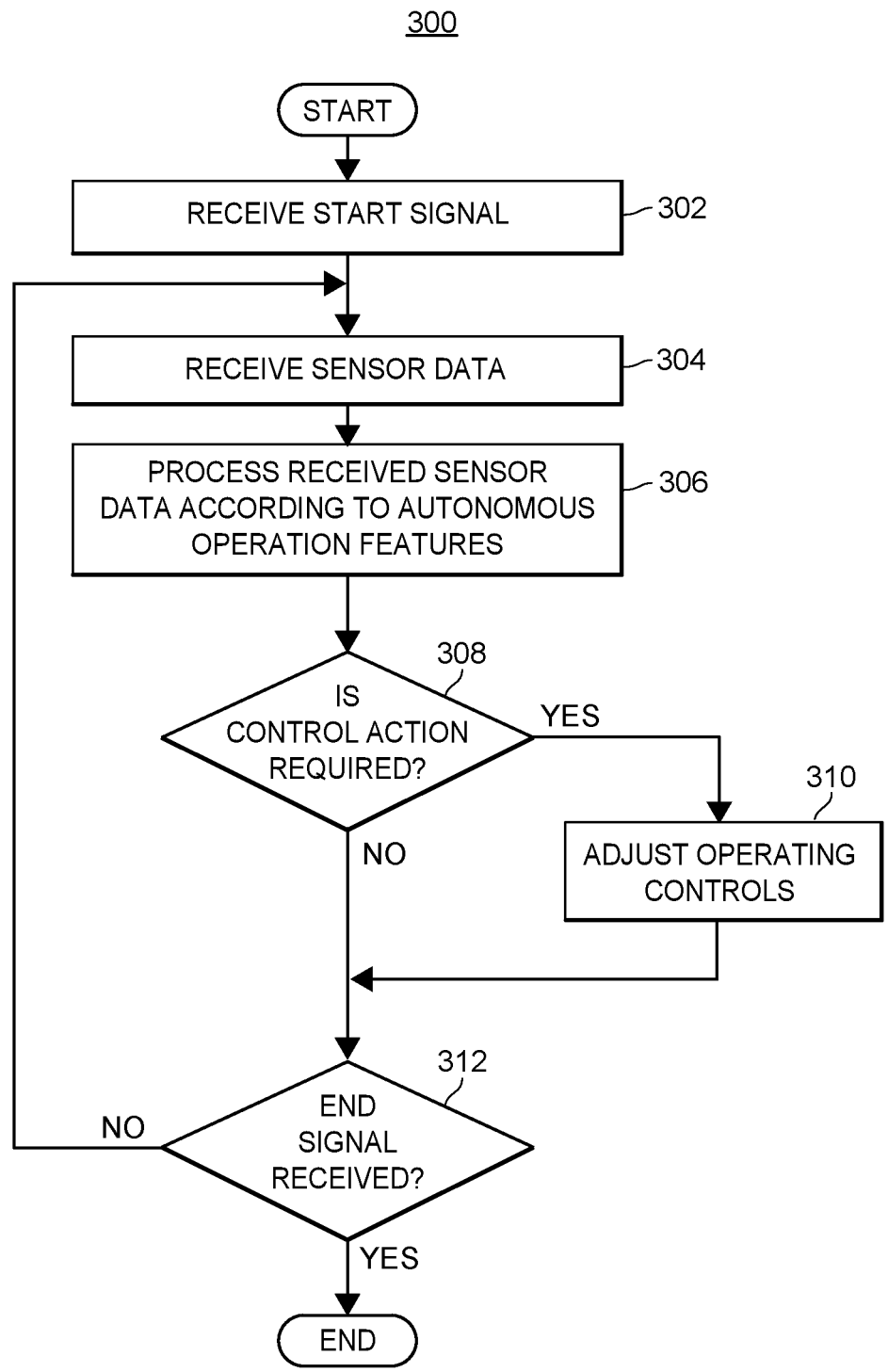
FIG. 3 illustrates a flow diagram of an exemplary autonomous vehicle operation computer-implemented method.

FIG. 3 illustrates a flow diagram of an exemplary autonomous vehicle operation method 300, which may be implemented by the autonomous vehicle data system 100. The computer-implemented method 300 may begin when the controller 204 receives a start signal (block 302). The start signal may be a command from the vehicle operator through the user-input device to enable or engage one or more autonomous operation features of the vehicle 108. In some embodiments, the vehicle operator 108 may further specify settings or configuration details for the autonomous operation features. For fully autonomous vehicles, the settings may relate to one or more destinations, route preferences, fuel efficiency preferences, speed preferences, or other configurable settings relating to the operation of the vehicle 108.

In some embodiments, fully autonomous vehicles may include additional features or settings permitting them to operate without passengers or vehicle operators within the vehicle. For example, a fully autonomous vehicle may receive an instruction to find a parking space within the general vicinity, which the vehicle may do without the vehicle operator. The vehicle may then be returned to a selected location by a request from the vehicle operator via a mobile device 110 or otherwise. This feature may further be adapted to return a fully autonomous vehicle if lost or stolen.

For other autonomous vehicles, the settings may include enabling or disabling particular autonomous (or semi-autonomous) operation features, specifying thresholds for autonomous operation, specifying warnings or other information to be presented to the vehicle operator, specifying autonomous communication types to send or receive, specifying conditions under which to enable or disable autonomous operation features, or specifying other constraints on feature operation. For example, a vehicle operator may set the maximum speed for an adaptive cruise control feature with automatic lane centering. In some embodiments, the settings may further include a specification of whether the vehicle 108 should be operating as a fully or partially autonomous vehicle.

In embodiments where only one autonomous operation feature is enabled, the start signal may consist of a request to perform a particular task (e.g., autonomous parking) or to enable a particular feature (e.g., autonomous braking for collision avoidance). In other embodiments, the start signal may be generated automatically by the controller 204 based upon predetermined settings (e.g., when the vehicle 108 exceeds a certain speed or is operating in low-light conditions). In some embodiments, the controller 204 may generate a start signal when communication from an external source is received (e.g., when the vehicle 108 is on a smart highway or near another autonomous vehicle). In some embodiments, the start signal may be generated by or received by the Data Application running on a mobile device 110 or on-board computer 114 within the vehicle 108. The Data Application may further set or record settings for one or more autonomous operation features of the vehicle 108.

After receiving the start signal at block 302, the controller 204 receives sensor data from the sensors 120 during vehicle operation (block 304). In some embodiments, the controller 204 may also receive information from external sources through the communication component 122 or the communication unit 220. The sensor data may be stored in the RAM 212 for use by the autonomous vehicle operation application 232. In some embodiments, the sensor data may be recorded in the data storage 228 or transmitted to the server 140 via the network 130. The Data Application may receive the sensor data, or a portion thereof, and store or transmit the received sensor data. In some embodiments, the Data Application may process or determine summary information from the sensor data before storing or transmitting the summary information.

The sensor data may alternately either be received by the controller 204 as raw data measurements from one of the sensors 120 or may be preprocessed by the sensor 120 prior to being received by the controller 204. For example, a tachometer reading may be received as raw data or may be preprocessed to indicate vehicle movement or position. As another example, a sensor 120 comprising a radar or LIDAR unit may include a processor to preprocess the measured signals and send data representing detected objects in 3-dimensional space to the controller 204.

The autonomous vehicle operation application 232 or other applications 230 or routines 240 may cause the controller 204 to process the received sensor data in accordance with the autonomous operation features (block 306). The controller 204 may process the sensor data to determine whether an autonomous control action is required or to determine adjustments to the controls of the vehicle 108 (i.e., control commands). For example, the controller 204 may receive sensor data indicating a decreasing distance to a nearby object in the vehicle's path and process the received sensor data to determine whether to begin braking (and, if so, how abruptly to slow the vehicle 108). As another example, the controller 204 may process the sensor data to determine whether the vehicle 108 is remaining with its intended path (e.g., within lanes on a roadway). If the vehicle 108 is beginning to drift or slide (e.g., as on ice or water), the controller 204 may determine appropriate adjustments to the controls of the vehicle to maintain the desired bearing. If the vehicle 108 is moving within the desired path, the controller 204 may nonetheless determine whether adjustments are required to continue following the desired route (e.g., following a winding road). Under some conditions, the controller 204 may determine to maintain the controls based upon the sensor data (e.g., when holding a steady speed on a straight road).

In some embodiments, the Data Application may record information related to the processed sensor data, including whether the autonomous operation features have determined one or more control actions to control the vehicle and/or details regarding such control actions. The Data Application may record such information even when no control actions are determined to be necessary or where such control actions are not implemented. Such information may include information regarding the vehicle operating environment determined from the processed sensor data (e.g., construction, other vehicles, pedestrians, anomalous environmental conditions, etc.). The information collected by the Data Application may further include an indication of whether and/or how the control actions are implemented using control components of the vehicle 108.

When the controller 204 determines an autonomous control action is required (block 308), the controller 204 may cause the control components of the vehicle 108 to adjust the operating controls of the vehicle to achieve desired operation (block 310). For example, the controller 204 may send a signal to open or close the throttle of the vehicle 108 to achieve a desired speed. Alternatively, the controller 204 may control the steering of the vehicle 108 to adjust the direction of movement. In some embodiments, the vehicle 108 may transmit a message or indication of a change in velocity or position using the communication component 122 or the communication module 220, which signal may be used by other autonomous vehicles to adjust their controls. As discussed elsewhere herein, the controller 204 may also log or transmit the autonomous control actions to the server 140 via the network 130 for analysis. In some embodiments, an application (which may be a Data Application) executed by the controller 204 may communicate data to the server 140 via the network 130 or may communicate such data to the mobile device 110 for further processing, storage, transmission to nearby vehicles or infrastructure, and/or communication to the server 140 via network 130.

The controller 204 may continue to receive and process sensor data at blocks 304 and 306 until an end signal is received by the controller 204 (block 312). The end signal may be automatically generated by the controller 204 upon the occurrence of certain criteria (e.g., the destination is reached or environmental conditions require manual operation of the vehicle 108 by the vehicle operator). Alternatively, the vehicle operator may pause, terminate, or disable the autonomous (or semi-autonomous) operation feature or features using the user-input device or by manually operating the vehicle's controls, such as by depressing a pedal or turning a steering instrument. When the autonomous operation features are disabled or terminated, the controller 204 may either continue vehicle operation without the autonomous features or may shut off the vehicle 108, depending upon the circumstances.

Where control of the vehicle 108 must be returned to the vehicle operator, the controller 204 may alert the vehicle operator in advance of returning to manual operation. The alert may include a visual, audio, or other indication to obtain the attention of the vehicle operator. In some embodiments, the controller 204 may further determine whether the vehicle operator is capable of resuming manual operation before terminating autonomous operation. If the vehicle operator is determined not to be capable of resuming operation, the controller 204 may cause the vehicle to stop or take other appropriate action.

To control the vehicle 108, the autonomous operation features may generate and implement control decisions relating to the control of the motive, steering, and stopping components of the vehicle 108. The control decisions may include or be related to control commands issued by the autonomous operation features to control such control components of the vehicle 108 during operation. In some embodiments, control decisions may include decisions determined by the autonomous operation features regarding control commands such feature would have issued under the conditions then occurring, but which control commands were not issued or implemented. For example, an autonomous operation feature may generate and record shadow control decisions it would have implemented if engaged to operate the vehicle 108 even when the feature is disengaged (or engaged using other settings from those that would produce the shadow control decisions).

Data regarding the control decisions actually implemented and/or the shadow control decisions not implemented to control the vehicle 108 may be recorded for use in assessing autonomous operation feature effectiveness, accident reconstruction and fault determination, feature use or settings recommendations, risk determination and insurance policy adjustments, or other purposes as described elsewhere herein. For example, actual control decisions may be compared against control decisions that would have been made by other systems, software versions, or with additional sensor data or communication data.

As used herein, the terms "preferred" or "preferably made" control decisions mean control decisions that optimize some metric associated with risk under relevant conditions. Such metric may include, among other things, a statistical correlation with one or more risks (e.g., risks related to a vehicle collision) or an expected value associated with risks (e.g., a risk-weighted expected loss associated with potential vehicle accidents). The preferably made, or preferred or recommended, control decisions discussed herein may include control decisions or control decision outcomes that are less risky, have lower risk or the lowest risk of all the possible or potential control decisions given various operating conditions, and/or are otherwise ideal, recommended, or preferred based upon various operating conditions, including autonomous system or feature capability; current road, environmental or weather, traffic, or construction conditions through which the vehicle is traveling; and/or current versions of autonomous system software or components that the autonomous vehicle is equipped with and using.

The preferred or recommended control decisions may result in the lowest level of potential or actual risk of all the potential or possible control decisions given a set of various operating conditions and/or system features or capabilities. Alternatively, the preferred or recommended control decisions may result in a lower level of potential or actual risk (for a given set of operating conditions) to the autonomous vehicle and passengers, and other people or vehicles, than some of the other potential or possible control decisions that could have been made by the autonomous system or feature.

Exemplary Vehicle Recall Notification Methods

Figure 4:
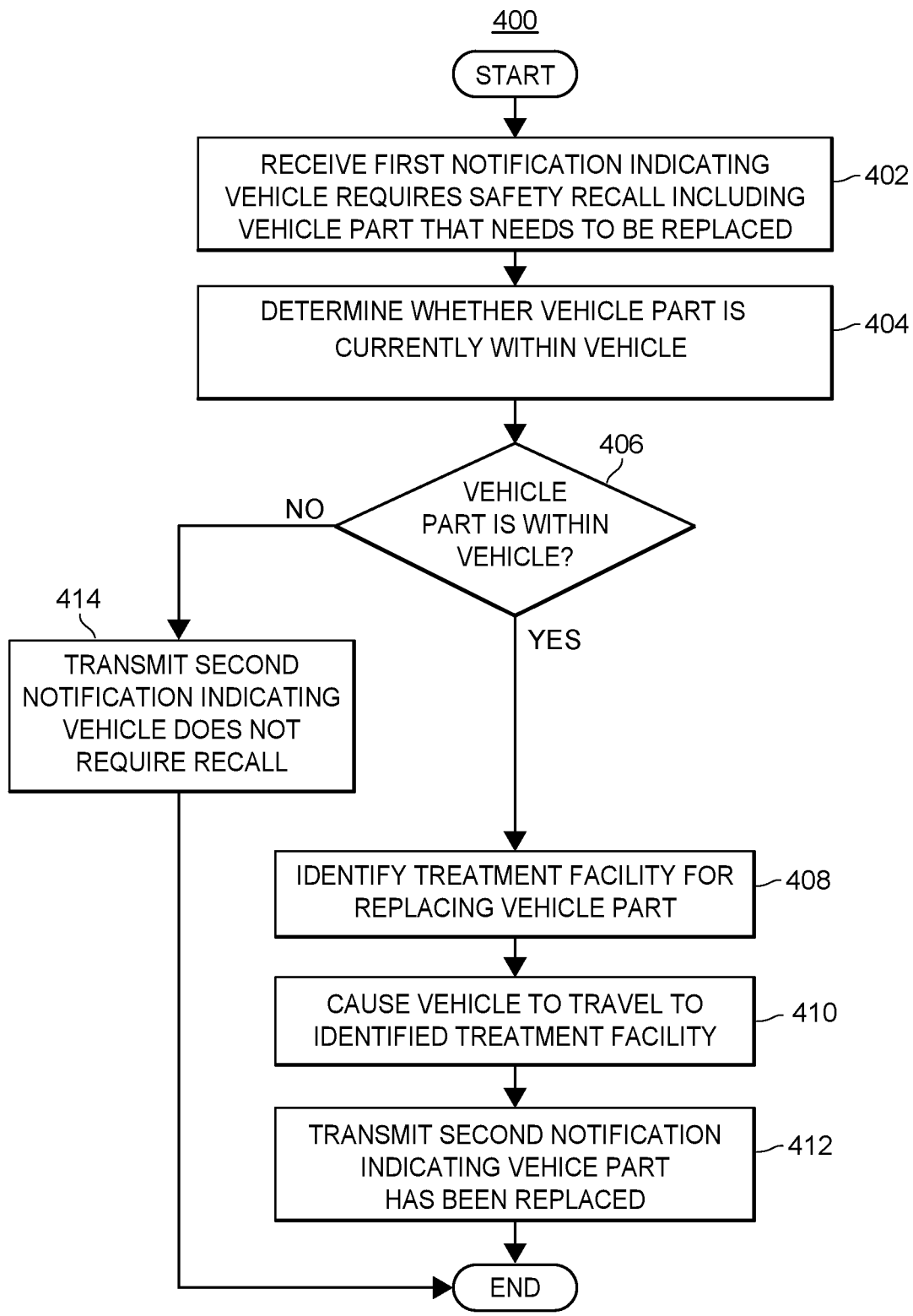
FIG. 4 illustrates a flow diagram of an exemplary autonomous vehicle computer-implemented method for obtaining a vehicle recall notification and causing an autonomous vehicle to travel to a treatment facility in accordance with the vehicle recall notification.

FIG. 4 illustrates a flow diagram of an exemplary autonomous vehicle recall notification computer-implemented method 400 for obtaining a vehicle recall notification and causing an autonomous vehicle 108 to travel to a treatment facility 192 in accordance with the vehicle recall notification. In some embodiments, the autonomous vehicle recall notification computer-implemented method 400 may be implemented on the on-board computer 114 or mobile device 110 in the autonomous vehicle 108. The autonomous vehicle 108 may be operating in a fully autonomous mode of operation without any control decisions being made by a vehicle operator, excluding navigation decisions such as selection of a destination or route. In some embodiments, the autonomous vehicle 108 may be operating without any passengers or with only passengers who are physically or legally unable to operate the fully autonomous vehicle 108 in a manual or semi-autonomous mode of operation (e.g., children, persons suffering acute illness, intoxicated or otherwise impaired persons, etc.). In other embodiments, the autonomous vehicle 108 may be operating in a partially autonomous mode of operation with at least some of the control decisions being made by a vehicle operator.

The autonomous vehicle recall notification method 400 may begin by receiving a first notification indicating that the vehicle requires a safety recall (block 402), and/or including identification information for a vehicle part that needs to be replaced. In response to receiving the first notification, the on-board computer 114 or mobile device 110 in the autonomous vehicle 108 may determine whether the vehicle part is currently operating within the vehicle 108 (block 404). If the vehicle part is operating within the vehicle 108 (block 406), the on-board computer 114 or mobile device 110 may identify a treatment facility for replacing the vehicle part (block 408). Then the on-board computer 114 or mobile device 110 may cause the vehicle 108 to travel to the identified treatment facility (block 410). Upon traveling to the treatment facility and/or having a replacement part installed within the vehicle 108, the on-board computer 114 or mobile device 110 may transmit a second notification indicating that the vehicle part has been replaced due to the recall and/or that the recall has been completed (block 412).

On the other hand, if the vehicle part is not operating within the vehicle (block 406), the on-board computer 114 or mobile device 110 may transmit a second notification indicating that the vehicle does not require a recall (block 414). Although the method 400 is described with reference to the on-board computer 114 or mobile device 110 for simplicity, the described method may be easily modified for implementation by other systems or devices, including one or more servers 140.

At block 402, the on-board computer 114 or mobile device 110 of the autonomous vehicle 108 may receive a first notification indicating that the vehicle 108 requires a safety recall and/or including a vehicle part that needs to be replaced. The first notification may be transmitted by the vehicle manufacturer 196, a vehicle safety agency 194, or a third-party organization separate from the vehicle manufacturer 196, such as an insurance provider 186 that insures the vehicle 108.

Then at block 404, the on-board computer 114 or mobile device 110 may determine whether the vehicle part is currently operating within the vehicle 108. More specifically, the on-board computer 114 or mobile device 110 may retrieve a list of vehicle parts currently operating within the vehicle 108 from a database, such as the data storage 228. Then the on-board computer 114 or mobile device 110 may determine whether the vehicle part is currently operating within the vehicle 108 by comparing identification information for the vehicle part to identification information for each of the vehicle parts in the retrieved list. In some embodiments, the vehicle manufacturer 196 may provide a pre-stored list of vehicle parts for the vehicle, which may be included in the data storage 228. Then each time a vehicle part is replaced, the treatment facility 192 may transmit identification information for the replacement part and for the vehicle part which was replaced to the on-board computer 114 or mobile device 110 for the on-board computer 114 or mobile device 110 to update the list.

In some embodiments, at least some of the vehicle parts may be smart vehicle parts that communicate with the on-board computer 114 or mobile device 110 via a wired or wireless network connection, such as Bluetooth. After being installed within the vehicle 108 and/or activated, the smart vehicle parts may communicate identification information to the on-board computer 114 or mobile device 110. Then the on-board computer 114 or mobile device 110 may maintain an up-to-date record of the vehicle parts currently operating within the vehicle based on the communications between the smart vehicle parts and the on-board computer 114 or mobile device 110. When a smart vehicle part is no longer in communication with the on-board computer 114 or mobile device 110, the on-board computer 114 or mobile device 110 may determine that the smart vehicle part has been removed from the vehicle and may remove it from the list.

Also in some embodiments, the on-board computer 114 or mobile device 110 may identify current vehicle parts operating within the vehicle 108 using object recognition techniques. More specifically, one or more cameras in the vehicle 108 may capture images of the interior and/or exterior of the vehicle 108. The on-board computer 114 or mobile device 110 may then analyze the images to identify barcodes or other tags in the images. The on-board computer 114 or mobile device 110 may then decode the barcodes to obtain identification information for the vehicle part associated with the barcode. The barcode may be a linear barcode such as a UPC code, a QR code, a 2D barcode, etc. The barcode may be scanned to identify a particular pattern, such as a pattern of black and white lines, a pattern of black and white pixels, etc. The on-board computer 114 or mobile device 110 may decode the pattern converting the pattern in the barcode to a text string or other data steam.

In addition to barcodes, the on-board computer 114 or mobile device 110 may identify text and/or words in the images. To identify the text and/or words, the on-board computer 114 or mobile device 110 may apply a stroke width transform (SWT), may use Maximally Stable Extremal Regions (MSER) techniques, may use an optical character recognition (OCR) engine, or may use any suitable combination of these techniques. The on-board computer 114 or mobile device 110 may then identify a vehicle part corresponding to a particular word or text string in the images. For example, an identified word or text string may be a part name and/or number for a particular vehicle part.

The on-board computer 114 or mobile device 110 may also analyze the images to identify objects within the images. The on-board computer 114 or mobile device 110 may identify features of each object, such as the geometry of the edges of the object, RGB pixel values or colors within the object, etc., to identify a particular vehicle part corresponding to the object. These features may be identified by detecting stable regions within the object that are detectable regardless of blur, motion, distortion, orientation, illumination, scaling, and/or other changes in camera perspective. The stable regions may be extracted from the object using a scale-invariant feature transform (SIFT), speeded up robust features (SURF), fast retina keypoint (FREAK), binary robust invariant scalable keypoints (BRISK), or any other suitable computer vision techniques. In some embodiments, keypoints may be located at high-contrast regions of the object, such as edges within the object. A bounding box may be formed around a keypoint and the portion of the object created by the bounding box may be a feature.

The on-board computer 114 or mobile device 110 may compare the features identified for the object to features from template objects (also referred to herein as "template features") using image classification and/or machine learning techniques, where the template objects represent various vehicle parts (e.g., Airbag #2201987, Anti-Lock Brakes Control Unit #6654, etc.). The machine learning techniques may include linear regression, polynomial regression, logistic regression, random forests, boosting, nearest neighbors, Bayesian networks, neural networks, support vector machines, or any other suitable machine learning technique. Then each of these template features may be compared to the features for an object.

In some embodiments, the template features may be compared to the features for an object using a nearest neighbors algorithm. The nearest neighbors algorithm may identify template features which are the closest to the features of the object by creating numerical representations of the features to generate feature vectors. The numerical representations of the features or feature vectors of the object may be compared to the feature vectors of template objects to determine a vector distance between the features of the object and each template object. The on-board computer 114 or mobile device 110 may then determine whether the object corresponds to a particular vehicle part based on the amount of similarity, or the vector distance in the nearest neighbors algorithm, between the features for the object and the features for a template object that represents the particular vehicle part. If the amount of similarity or vector distance is within a threshold amount, the on-board computer 114 or mobile device may identify the object as the particular vehicle part.

In other embodiments, the on-board computer 114 or mobile device 110 may transmit the images to the external computing device 186. The external computing device 186 may then perform the machine learning techniques and/or object recognition techniques to identify the vehicle parts currently within the vehicle 108.

Furthermore, the on-board computer 114 or mobile device 110 may identify current vehicle parts operating within the vehicle 108 using any suitable combination of retrieving a list of current vehicle parts from data storage 228, communicating with vehicle parts within the vehicle 108 to obtain identification information, and/or using object recognition techniques.

In any event, if the vehicle part is operating within the vehicle 108 (block 406), the on-board computer 114 or mobile device 110 may identify a treatment facility 192 for replacing the vehicle part (block 408). For example, the on-board computer 114 or mobile device 110 may identify the treatment facility 192 as the nearest dealership for the vehicle manufacturer 196 of the vehicle 108, the dealership from which the vehicle was purchased, the nearest treatment facility 192 to the vehicle, etc.

Then at block 410, the on-board computer 114 or mobile device 110 may cause the vehicle 108 to travel to the identified treatment facility. For example on-board computer 114 or mobile device 110 may generate navigation directions to treatment facility 192 (e.g., by communicating with a server 140, external computing device 186, etc.). Then the on-board computer 114 or mobile device 110 may directly or indirectly control the operation of the vehicle 108 according to various autonomous operation features to travel to the treatment facility 192 in accordance with the navigation directions. The autonomous operation features may include software applications or modules implemented by the on-board computer 114 or mobile device 110 to generate and implement control commands to control the steering, braking, or throttle of the semiautonomous vehicle 108. When a control command is generated by the on-board computer 114 or mobile device 110, it may thus be communicated to the control components of the vehicle 108 to effect a control action. The on-board computer 114 or mobile device 110 may generate control commands to brake, accelerate, steer into another lane, turn onto another road, etc. Accordingly, upon receiving a notification regarding a recall, the autonomous vehicle 108 may automatically travel to a treatment facility 192 so that the appropriate vehicle part(s) may be replaced in accordance with the recall. In this manner, the safety of the autonomous vehicle operation is improved by ensuring that dangerous or potentially dangerous vehicle parts are no longer within the vehicle 108.

Upon traveling to the treatment facility and/or having a replacement part installed within the vehicle 108, at block 412 the on-board computer 114 or mobile device 110 may transmit a second notification indicating that the vehicle part has been replaced due to the recall and/or that the recall has been completed. The second notification may be a response notification including status updates, such as the recall is in progress, the recall has been completed, etc. The response notification may also include identification information for a replacement vehicle part installed within the vehicle. In this manner, the third-party organization, vehicle manufacturer 196, and/or vehicle safety agency 194 may maintain an up-to-date record of the vehicle parts within each vehicle.

On the other hand, if the vehicle part is not operating within the vehicle (block 406), the on-board computer 114 or mobile device 110 may transmit a second notification indicating that the vehicle does not require a recall (block 414).

Figure 5:
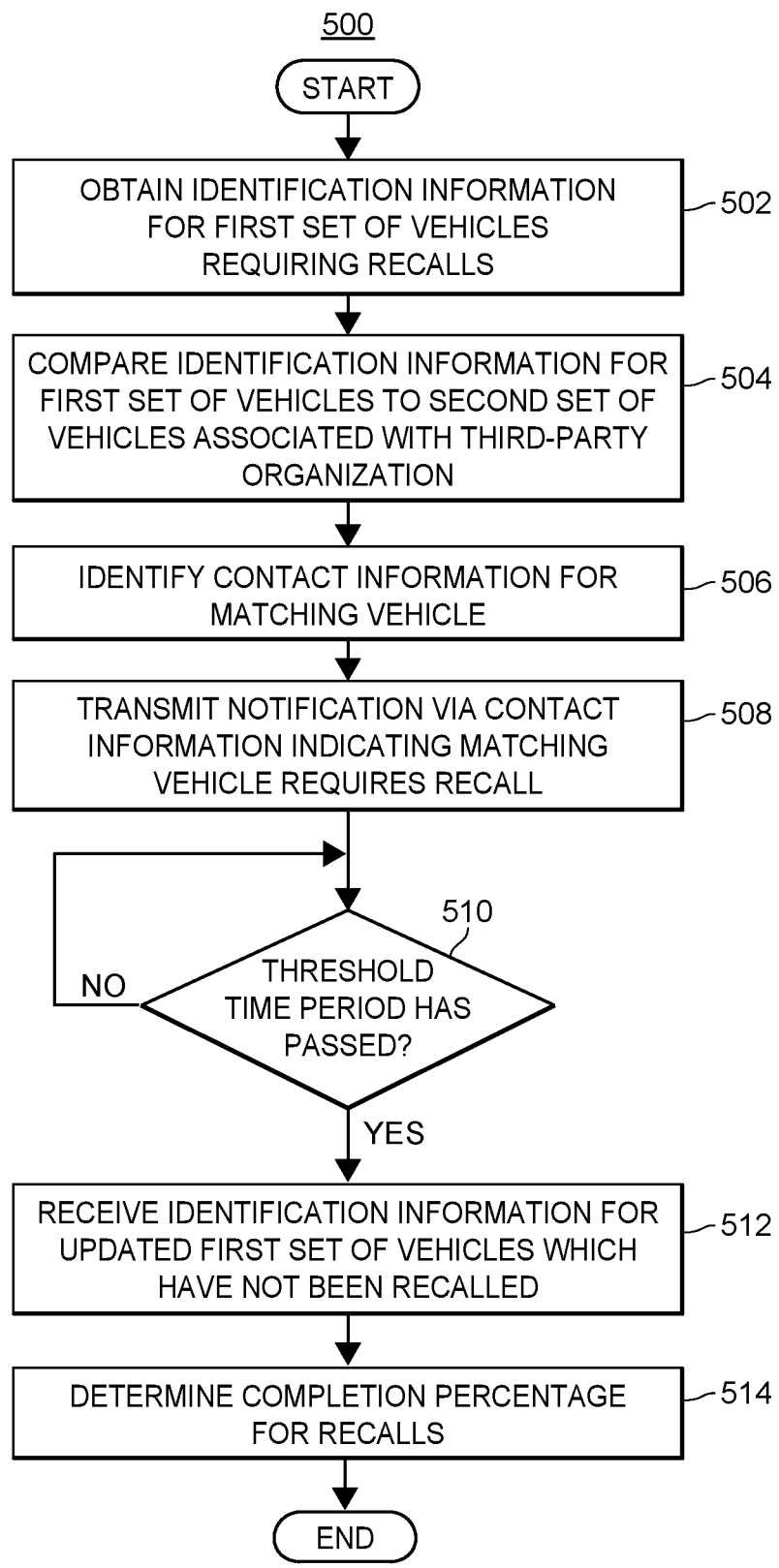
FIG. 5 illustrates a flow diagram of an exemplary computer-implemented method for transmitting vehicle recall notifications from a third-party organization such as an insurance provider.

FIG. 5 illustrates a flow diagram of an exemplary computer-implemented method 500 for transmitting vehicle recall notifications from a third-party organization 186. In some embodiments, the computer-implemented method 500 may be implemented on the external computing device 186 of a third-party organization, such as an insurance provider. The external computing device 186 may communicate with autonomous vehicles 108 or traditional (non-autonomous) vehicles 182.2.

The computer-implemented method 500 may begin by obtaining identification information for a first set of vehicles requiring recalls (block 502). The external computing device 186 may compare identification information for the first set of vehicles to a second set of vehicles associated with the third-party organization (block 504). Then the external computing device 186 may identify contact information for a matching vehicle in the first and second sets (block 506). The external computing device 186 may transmit a notification indicating that the matching vehicle requires a recall to the vehicle or the vehicle owner via the contact information (block 508). In response to determining that a threshold amount of time has passed since sending the notification (block 510), the external computing device 186 may receive identification information for an updated first set of vehicles which have not been recalled (block 512). The external computing device 186 may then determine a completion percentage of the amount of vehicles which have been recalled based on the initial first set of vehicles, the updated first set of vehicles, and/or the second set of vehicles associated with the third-party organization (block 514).

At block 502, the external computing device 186 may obtain identification information for a first set of vehicles requiring recalls. The identification information may be a vehicle identification number (VIN), a make, model, and year of the vehicle, etc. For example, the external computing device 186 may obtain a first list of vehicles requiring recalls from the vehicle manufacturer 196, and/or may maintain multiple lists of vehicles requiring recalls from multiple vehicle manufacturers 196. In another example, the external computing device 186 may obtain a first list of vehicles requiring recalls from a vehicle safety agency 194.

The external computing device 186 may then retrieve a second list of vehicles associated with the third-party organization (e.g., insured by the insurance provider). At block 504, the external computing device 186 compares the first and second lists to identify vehicles in the second list which require recalls (e.g., insured vehicles which require recalls).

Then at block 506, the external computing device 186 identifies contact information for a matching vehicle (e.g., a name, address, and/or phone number of the vehicle owner). The external computing device 186 may retrieve the contact information from an insurance profile where the vehicle is listed as an insured asset.

At block 508, the external computing device 186 transmits a notification, via the contact information to the vehicle or a vehicle owner, indicating that the vehicle requires a recall. The notification may be presented via a user interface of the vehicle owner's mobile device 110 and/or other computing device, or via a display within the vehicle. The notification may include a description of the recall and am explanation of why the recall is necessary. Additionally, the notification may include vehicle part information for a vehicle part that needs to be replaced due to the recall. Furthermore, the notification may include information on treatment facilities equipped to handle the recall. For example, the notification may instruct the vehicle or vehicle owner to travel to a particular dealership that will perform the recall.

Moreover, the notification may include visual elements presented in a style corresponding to the vehicle manufacturer 196 (e.g., with a background color and/or logo of the vehicle manufacturer), may include visual elements presented in a style corresponding to the insurance provider (e.g., with a background color and/or logo of the insurance provider), and/or may be include visual elements presented in a style that combines the two. In this manner, the present embodiments direct a user to a display that presents information from the vehicle manufacturer and visual 'look and feel' elements from the insurance provider.

In response to transmitting the notification, the external computing device 186 may receive a response notification from the vehicle, vehicle owner's mobile device 110, and/or the treatment facility 192 indicating that the vehicle part has been replaced. The response notification may include status updates, such as the recall is in progress, the recall has been completed, etc. The response notification may also include identification information for a replacement vehicle part installed within the vehicle. In this manner, the third-party organization may maintain an up-to-date record of the vehicle parts within each vehicle.

After a threshold time period (e.g., 30 days, 60 days, a week, two weeks, a month, three months, six months, etc.) (block 510), the external computing device 186 may receive an updated list of vehicles which have not been recalled (block 512). For example, the external computing device 186 may receive the updated list from the vehicle manufacturer 196, from multiple vehicle manufacturers 196, a vehicle safety agency 194, etc.

Then the external computing device 186 may determine a completion percentage of vehicles which have completed the recall based upon the updated list (block 514). In some embodiments, the external computing device 186 may determine the number of vehicles insured by the insurance provider which required a recall from the initial first and second lists. The external computing device 186 may also determine the number of vehicles insured by the insurance provider which completed the recall based upon the number of vehicles from the initial second list missing in the updated list. Then the external computing device 186 may divide the number of vehicles insured by the insurance provider which completed the recall by the number of number of vehicles insured by the insurance provider which initially required a recall to determine the completion percentage and/or to determine the completion percentage for vehicles insured by the insurance provider.

In some embodiments, the external computing device 186 may also determine an overall completion percentage by subtracting the number of vehicles from the updated list from the number of vehicles in the initial first list to determine the overall number of vehicles which completed the recall. The external computing device 186 may then divide the overall number of vehicles which completed the recall by the number of vehicles in the initial first list to determine the overall completion percentage.

Also in some embodiments, the external computing device 186 may compare the completion percentage for vehicles insured by the insurance provider to the overall completion percentage. For example, the external computing device 186 may subtract the completion percentage for vehicles insured by the insurance provider from the overall completion percentage to determine the difference in completion percentages.

The external computing device 186 may then categorize the difference in completion percentage. For example, insured completion percentages within 10% of the overall completion percentage may be categorized as average, insured completion percentages between 10% and 20% above the overall completion percentage may be categorized as above average, and insured completion percentages more than 20% above the overall completion percentage may be categorized as excellent.

The external computing device 186 may then transmit the insured completion percentage, the overall completion percentage, the difference in completion percentages, and/or the difference category to a client device for display (e.g., an insurance provider client device). In this manner, the insurance provider may determine whether the notifications are causing additional recalls to be performed. If the notifications are not increasing the number of recalls being performed, the insurance provider may provide additional notifications to the vehicles and/or vehicle owners. The insurance provider may also review the contact information and/or response rates from the vehicles and/or vehicle owners to identify the problem.

Accordingly, the present embodiments advantageous improve vehicle safety by increasing the number of vehicles which complete a recall. While a vehicle manufacturer 196 may have difficulties contacting each of the vehicles/vehicle owners during a recall, the third-party organization assists by retrieving contact information associated with the vehicles from their databases. Also, by determining a completion percentage the third-party organization may determine how successful the recall has been and may identify areas for improvement. Additionally, by communicating with vehicle safety agencies 194 in addition to vehicle manufacturers 196, the third-party organization may identify vehicles requiring recalls which the vehicle manufacturers were unable to or chose not to identify.

In any event, the external computing device 186 may compare the updated list of vehicles which have not been recalled to the response notifications received from vehicles or vehicle owners. If the external computing device 186 determines that a vehicle is included in the updated list when a response notification was sent for the vehicle indicating that the recall had been completed for the vehicle, the external computing device 186 may communicate with the vehicle manufacturer 196 to notify the vehicle manufacturer 196 that the vehicle has completed the recall. The vehicle manufacturer 196 may then update the list accordingly.

Exemplary Distributed Ledger System

Traditionally, vehicle manufacturers, insurance companies, vehicle rental companies, regulatory organizations, and/or other organizations involved in assessing the value/safety of a vehicle have limited access to information about the vehicles, such as year, make, model, mileage, and physical appearance. Organizations which are able to receive more specific information regarding current vehicle parts within the vehicles have to rely on the information being reported accurately and may be unable to prevent the information from being tampered with. Often this information is stored in centralized databases held by the organizations. However, the centralized databases are vulnerable to attacks from unauthorized parties attempting to access the information.

In some embodiments, current vehicle part information for vehicles may be recorded via a distributed ledger which may be a blockchain. In this manner, there may be a trustless, secure, and immutable record of the parts within each vehicle which cannot be tampered with by a particular vehicle manufacturer that does not want to pay for an expensive recall. Then when a recall is announced for a particular vehicle part, a third-party organization such as an insurance provider may monitor the distributed ledger to identify vehicles having the particular vehicle part.

A blockchain (also referred to herein as a distributed ledger or a shared ledger) is a way of achieving a distributed consensus on the validity or invalidity of information in the chain. In other words, the blockchain provides a decentralized trust to participants and observers. As opposed to relying on a central authority, a blockchain is a decentralized database in which a transactional record of changes to the ledger is maintained and validated by each node of a peer-to-peer network. The distributed ledger is comprised of groupings of transactions organized together into a "block," and ordered sequentially (thus the term "blockchain"). Nodes may join and leave the blockchain network over time and may obtain blocks that were propagated while the node was gone from peer nodes. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network. The nodes in the distributed ledger network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirement and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules are propagated from nodes that have validated the addition to other nodes that the validating node is aware of. If all the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable.

The validation activities of nodes applying consensus rules on a blockchain network may take various forms. In one implementation, the blockchain may be viewed as a shared spreadsheet that tracks data such as the ownership of assets. In another implementation, the validating nodes execute code contained in "smart contracts" and distributed consensus is expressed as the network nodes agreeing on the output of the executed code.

Blockchains may be deployed in a public, decentralized, and permissionless manner meaning that any party may view the shared ledger, submit new information to be added to the ledger, or join the network as a validating node. Other blockchains are private (e.g., permissioned ledgers) that keep chain data private among a group of entities authorized to participate in the blockchain network.

The present embodiments relate to systems and methods for using a blockchain to record and manage vehicle part information for vehicles. The vehicle part blockchain may be either a public or permissioned ledger.

Figure 6:
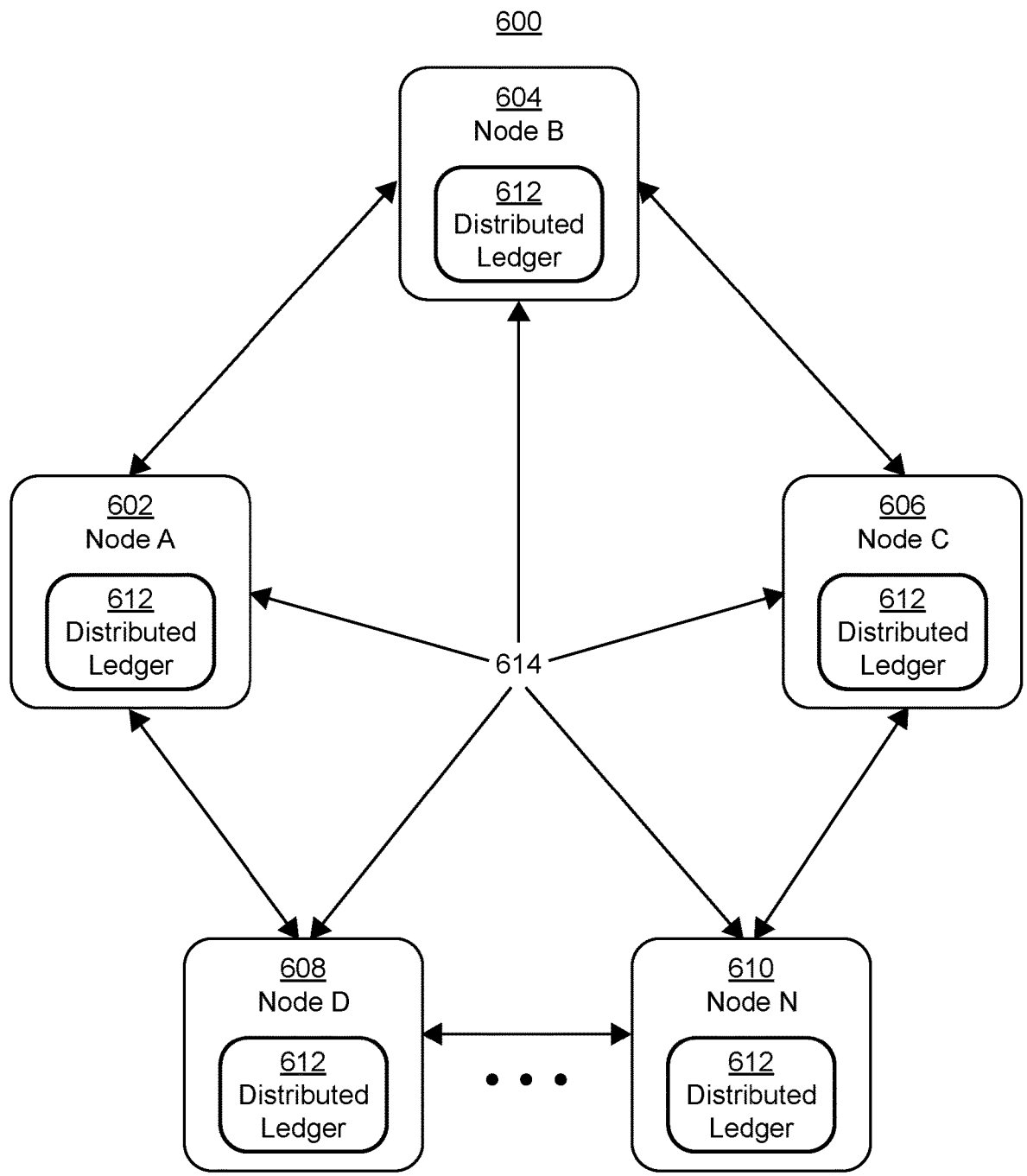
FIG. 6 illustrates an exemplary distributed ledger system for recording current vehicle part information for vehicles to identify vehicles having a particular vehicle part that needs to be replaced during a safety recall.

FIG. 6 depicts an exemplary distributed ledger system 600 for recording vehicle part information for vehicles. The distributed ledger may include identification information for each vehicle such as a VIN number, a make, model, and year of the vehicle, etc. Then for each vehicle, the distributed ledger may include vehicle part information, such as a type of vehicle part (e.g., an airbag, brakes, suspension systems, etc.), a make, a vehicle part number, a vehicle part name, etc. for the vehicle parts within the vehicle. The vehicle part information may also include an indication of the previous vehicle part which was replaced by a current vehicle part. In this manner, the distributed ledger may maintain an up-to-date record of the vehicle parts currently within the vehicle and the vehicle parts which are no longer within the vehicle.

The system 600 includes a distributed ledger 612 and plurality of nodes 602, 604, 606, 608, and 610, which may be vehicle manufacturer 196 computing devices, treatment facility 192 computing devices, third-party organization 186 computing devices, or any suitable computing devices operating within the recall notification communication system 180. Each node maintains a copy of the distributed ledger 612. As changes are made to the distributed ledger 612, each node receives the change via the network 614 and updates its respective copy of the distributed ledger 612. A consensus mechanism may be used by the nodes 602-610 in the distributed ledger system 600 to decide whether it is appropriate to make received changes to the distributed ledger 612.

Each node in the system therefore has its own copy of the distributed ledger 612, which is identical to every other copy of the distributed ledger 612 stored by the other nodes. The distributed ledger system 600 may be more robust than a central authority database system because of the distributed ledger's decentralized nature. As such, there is no single point of failure on the distributed ledger system 600 as there would be in a centralized system.

Figure 7:
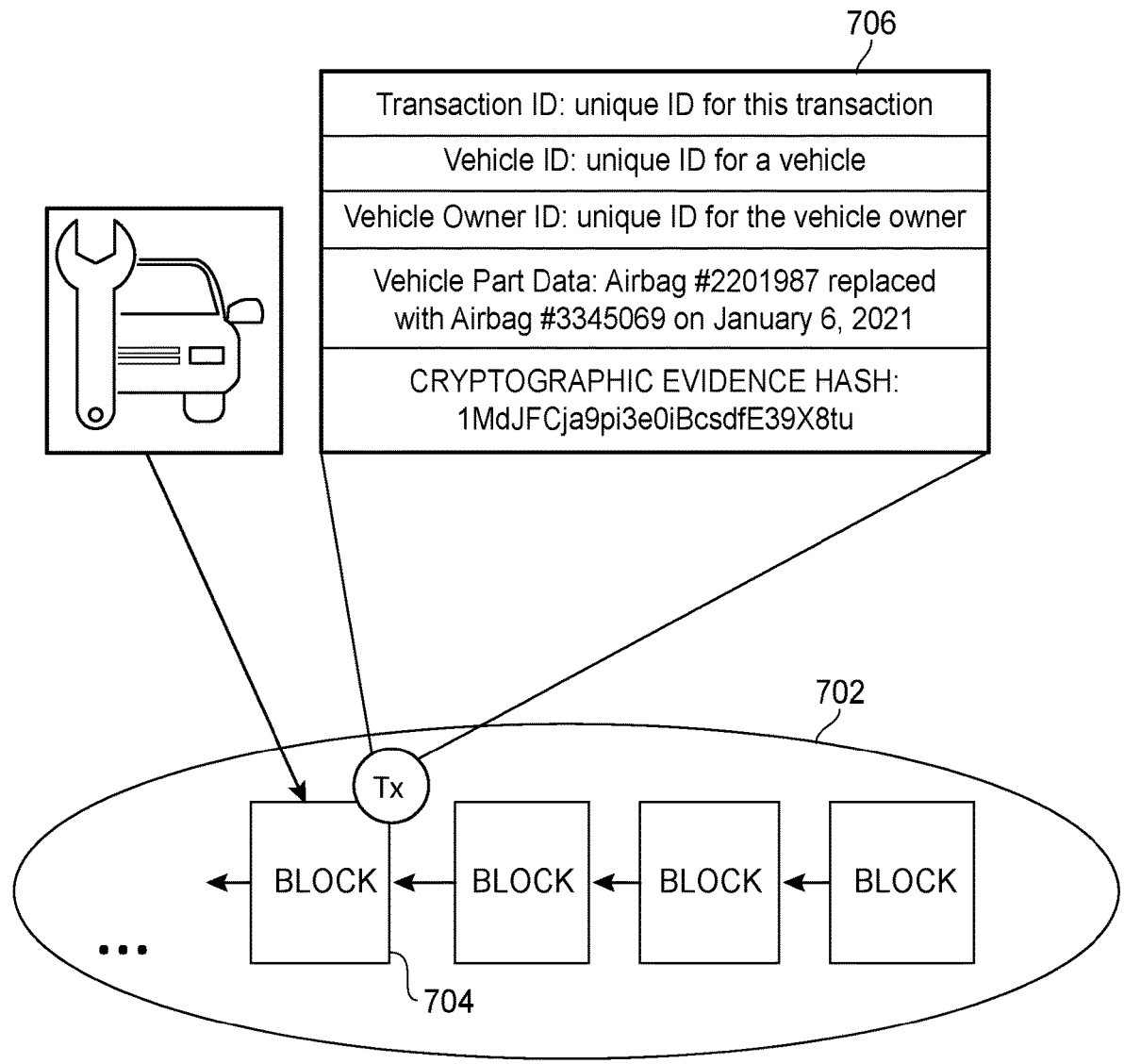
FIG. 7 illustrates an exemplary transaction representing a replacement vehicle part in a distributed ledger network for recording current vehicle part information.

FIG. 7 depicts an exemplary transaction 706 reporting a replacement vehicle part installed within a vehicle. Each time a vehicle part is replaced within a vehicle in the recall notification communication system 180, a transaction is broadcasted to the distributed ledger indicating up-to-date vehicle part information for the vehicle for the distributed ledger to maintain up-to-date records of vehicle parts within the vehicles. The transaction 706 may be generated by a treatment facility 192 acting as an evidence oracle that provides evidence regarding vehicle part information to blockchain 702. When the treatment facility 192 replaces an old vehicle part with a new vehicle part within a vehicle, the treatment facility 192 may broadcast a transaction 706 to blockchain 702 to be included in a block, such as block 704.

The transaction 706 may include a transaction ID and an originator such as treatment facility 192 (identified by a cryptographic proof-of-identity). The transaction 706 may also include identification information for the vehicle such as a VIN number, and/or identification information for the vehicle owner such as the name, address, and/or phone number for the owner. Furthermore, the transaction 706 may include vehicle part information, such as a type of vehicle part (e.g., an airbag, brakes, suspension systems, etc.), a make, a vehicle part number, a vehicle part name, etc. for a replacement part installed within the vehicle. The vehicle part information may also include an indication of the previous vehicle part which was replaced by the current vehicle part. Moreover, the transaction 706 may include a cryptographic hash of the vehicle part information. In another implementation, the vehicle part information is not stored as a cryptographic hash, but is directly accessible in block 704 by an observer or other network participant.

While in this example, the treatment facility 192 generates a transaction, the on-board computer 114 or mobile device 114 within the vehicle, and/or the third-party organization computing device 186 may generate a transaction. This transaction may be generated in addition or as an alternative to the transaction by the treatment facility 192.

Exemplary Vehicle Recall Notification Methods Using a Distributed Ledger

Figure 8:
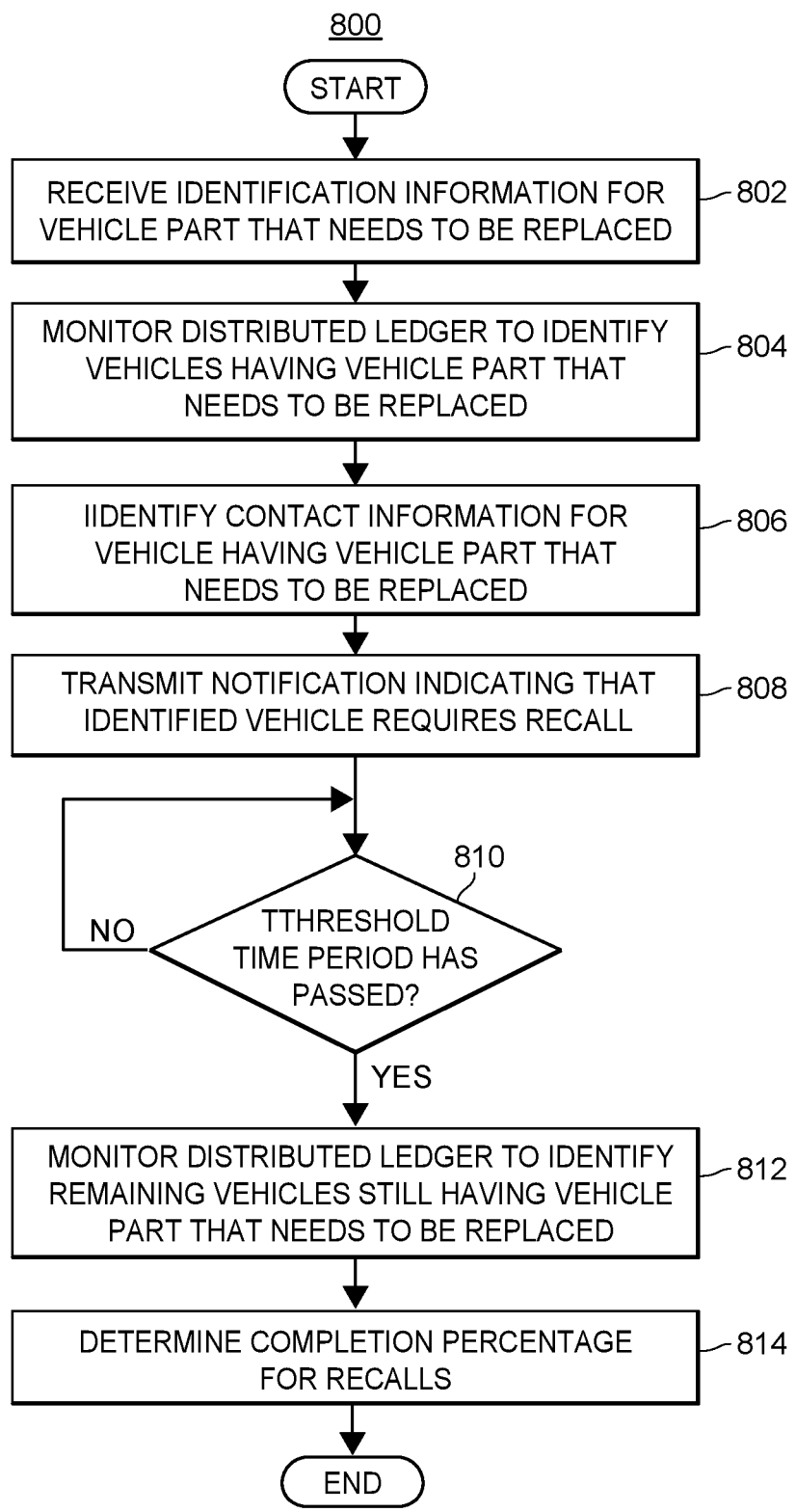
FIG. 8 illustrates a flow diagram of an exemplary computer-implemented method for identifying vehicles requiring safety recalls using a distributed ledger.

FIG. 8 illustrates a flow diagram of an exemplary computer-implemented method 800 for identifying vehicles requiring safety recalls using a distributed ledger. In some embodiments, the method 800 may be implemented on the external computing device 186 of a third-party organization, such as an insurance provider. The external computing device 186 may communicate with autonomous vehicles 108 or traditional (non-autonomous) vehicles 182.2.

The method 800 may begin by obtaining identification information for a vehicle part that needs to be replaced due to a recall (block 802). The external computing device 186 may monitor a distributed ledger to identify vehicles having the vehicle part that needs to be replaced (block 804). Then the external computing device 186 may identify contact information for a vehicle having the vehicle part that needs to be replaced (block 806). The external computing device 186 may transmit a notification indicating that the matching vehicle requires a recall to the vehicle or the vehicle owner via the contact information (block 808). In response to determining that a threshold amount of time has passed since sending the notification (block 810), the external computing device 186 may monitor the distributed ledger to identify remaining vehicles which have the vehicle part and have not been recalled (block 812). The external computing device 186 may then determine a completion percentage of the amount of vehicles which have been recalled based on the initial set of vehicles in the distributed ledger having the vehicle part, and/or the remaining set of vehicles in the distributed ledger having the vehicle part (block 814).

At block 802, the external computing device 186 may obtain identification information for a vehicle part that needs to be replaced due to a recall. For example, the external computing device 186 may obtain the identification information for the vehicle part from the vehicle manufacturer 196, and/or from multiple vehicle manufacturers 196. In another example, the external computing device 186 may obtain the identification information for the vehicle part from a vehicle safety agency 194.

At block 804, the external computing device 186 may monitor a distributed ledger to identify vehicles having the vehicle part that needs to be replaced. In some embodiments, the external computing device 186 may obtain a first list of vehicles having the vehicle part that needs to be replaced from the distributed ledger. Then the external computing device 186 may retrieve a second list of vehicles associated with the third-party organization (e.g., insured by the insurance provider). The external computing device 186 may compare the first and second lists to identify vehicles in the second list which require recalls (e.g., insured vehicles which require recalls).

Then at block 806, the external computing device 186 identifies contact information for a vehicle having the vehicle part that needs to be replaced (e.g., a name, address, and/or phone number of the vehicle owner). The external computing device 186 may retrieve the contact information from an insurance profile where the vehicle is listed as an insured asset.

At block 808, the external computing device 186 transmits a notification, via the contact information to the vehicle or a vehicle owner, indicating that the vehicle requires a recall. The notification may be presented via a user interface of the vehicle owner's mobile device 110 or other computing device, or via a display within the vehicle. The notification may include a description of the recall and am explanation of why the recall is necessary. Additionally, the notification may include vehicle part information for a vehicle part that needs to be replaced due to the recall. Furthermore, the notification may include information on treatment facilities equipped to handle the recall. For example, the notification may instruct the vehicle or vehicle owner to travel to a particular dealership that will perform the recall.

Moreover, the notification may include visual elements presented in a style corresponding to the vehicle manufacturer 196 (e.g., with a background color and/or logo of the vehicle manufacturer), may include visual elements presented in a style corresponding to the insurance provider (e.g., with a background color and/or logo of the insurance provider), and/or may be include visual elements presented in a style that combines the two. In this manner, the present embodiments direct a user to a display that presents information from the vehicle manufacturer and visual 'look and feel' elements from the insurance provider.

In response to transmitting the notification, the external computing device 186 may receive a response notification from the vehicle, vehicle owner's mobile device 110, and/or the treatment facility 192 indicating that the vehicle part has been replaced. The response notification may include status updates, such as the recall is in progress, the recall has been completed, etc. The response notification may also include identification information for a replacement vehicle part installed within the vehicle. In this manner, the third-party organization may maintain an up-to-date record of the vehicle parts within each vehicle.

After a threshold time period (e.g., 30 days, 60 days, a week, two weeks, a month, three months, six months, etc.) (block 810), the external computing device 186 may monitor the distributed ledger to identify remaining vehicles which have the vehicle part and have not been recalled (block 812). For example, treatment facilities 192, and/or on-board computers 114 or mobile device 110 within vehicles may transmit transactions to the distributed ledger indicating that the vehicle part has been replaced and/or indicating a replacement vehicle part installed within the vehicle.

Then the external computing device 186 may determine a completion percentage of vehicles which have completed the recall based upon the remaining vehicles which have the vehicle part and have not been recalled (block 814). In some embodiments, the external computing device 186 may determine the number of vehicles insured by the insurance provider which required a recall from the initial first and second lists. The external computing device 186 may also determine the number of vehicles insured by the insurance provider which completed the recall based upon the number of vehicles from the initial second list missing in the remaining vehicle list. Then the external computing device 186 may divide the number of vehicles insured by the insurance provider which completed the recall by the number of number of vehicles insured by the insurance provider which initially required a recall to determine the completion percentage and/or to determine the completion percentage for vehicles insured by the insurance provider.

In some embodiments, the external computing device 186 may also determine an overall completion percentage by subtracting the number of vehicles from the remaining vehicle list from the number of vehicles in the initial first list to determine the overall number of vehicles which completed the recall. The external computing device 186 may then divide the overall number of vehicles which completed the recall by the number of vehicles in the initial first list to determine the overall completion percentage. Also in some embodiments, the external computing device 186 may compare the completion percentage for vehicles insured by the insurance provider to the overall completion percentage. For example, the external computing device 186 may subtract the completion percentage for vehicles insured by the insurance provider from the overall completion percentage to determine the difference in completion percentages.

The external computing device 186 may then categorize the difference in completion percentage. For example, insured completion percentages within 10% of the overall completion percentage may be categorized as average, insured completion percentages between 10% and 20% above the overall completion percentage may be categorized as above average, and insured completion percentages more than 20% above the overall completion percentage may be categorized as excellent.

The external computing device 186 may then transmit the insured completion percentage, the overall completion percentage, the difference in completion percentages, and/or the difference category to a client device for display (e.g., an insurance provider client device). In this manner, the insurance provider may determine whether the notifications are causing additional recalls to be performed. If the notifications are not increasing the number of recalls being performed, the insurance provider may provide additional notifications to the vehicles and/or vehicle owners. The insurance provider may also review the contact information and/or response rates from the vehicles and/or vehicle owners to identify the problem.

Also in some embodiments, the external computing device 186 may receive identification information for a set of vehicles requiring recalls from the vehicle manufacturer 196. The external computing device 186 may then compare the set of vehicles to the vehicles identified from the distributed ledger 612 as having the vehicle part that needs to be replaced to verify that the set of vehicles from the vehicle manufacturer 196 require recalls. In response to determining that one of the identified vehicles from the distributed ledger 612 is not included in the set of vehicles from the vehicle manufacturer 196, the external computing device 186 may communicate with the vehicle manufacturer 196 to provide the vehicle manufacturer 196 with identification information for the identified vehicle that is not included in the set of vehicles from the vehicle manufacturer 196. The external computing device 186 may also communicate with the vehicle manufacturer 196 to determine the reason for the identified vehicle not being included in the set of vehicles from the vehicle manufacturer 196.

Autonomous Vehicle Insurance Policies

The disclosure herein relates in part to insurance policies for vehicles with autonomous operation features. Accordingly, as used herein, the term "vehicle" may refer to any of a number of motorized transportation devices. A vehicle may be a car, truck, bus, train, boat, plane, motorcycle, snowmobile, air taxi, aerial vehicle, other personal transport devices, etc. Also as used herein, an "autonomous operation feature" of a vehicle means a hardware or software component or system operating within the vehicle to control an aspect of vehicle operation without direct input from a vehicle operator once the autonomous operation feature is enabled or engaged. Autonomous operation features may include semi-autonomous operation features configured to control a part of the operation of the vehicle while the vehicle operator control other aspects of the operation of the vehicle.

The term "autonomous vehicle" means a vehicle including at least one autonomous operation feature, including semi-autonomous vehicles. A "fully autonomous vehicle" means a vehicle with one or more autonomous operation features capable of operating the vehicle in the absence of or without operating input from a vehicle operator. Operating input from a vehicle operator excludes selection of a destination or selection of settings relating to the one or more autonomous operation features. Autonomous and semi-autonomous vehicles and operation features may be classified using the five degrees of automation described by the National Highway Traffic Safety Administration's.

Additionally, the term "insurance policy" or "vehicle insurance policy," as used herein, generally refers to a contract between an insurer and an insured. In exchange for payments from the insured, the insurer pays for damages to the insured which are caused by covered perils, acts, or events as specified by the language of the insurance policy. The payments from the insured are generally referred to as "premiums," and typically are paid by or on behalf of the insured upon purchase of the insurance policy or over time at periodic intervals.

Although the exemplary embodiments discussed herein relate to automobile insurance policies, it should be appreciated that an insurance provider may offer or provide one or more different types of insurance policies. Other types of insurance policies may include, for example, commercial automobile insurance, inland marine and mobile property insurance, ocean marine insurance, boat insurance, motorcycle insurance, farm vehicle insurance, aircraft or aviation insurance, and other types of insurance products.

Autonomous Automobile Insurance

Some aspects of some embodiments described herein may relate to assessing and pricing insurance based upon autonomous (or semi-autonomous) operation of the vehicle 108. Risk levels and/or insurance policies may be assessed, generated, or revised based upon the use of autonomous operation features or the availability of autonomous operation features in the vehicle 108. Additionally, risk levels and/or insurance policies may be assessed, generated, or revised based upon the effectiveness or operating status of the autonomous operation features (i.e., degree to which the features are operating as intended or are impaired, damaged, or otherwise prevented from full and ordinary operation). Thus, information regarding the capabilities or effectiveness of the autonomous operation features available to be used or actually used in operation of the vehicle 108 may be used in risk assessment and insurance policy determinations.

Insurance providers currently develop a set of rating factors based upon the make, model, and model year of a vehicle. Models with better loss experience receive lower factors, and thus lower rates. One reason that this current rating system cannot be used to assess risk for vehicles using autonomous technologies is that many autonomous operation features vary for the same vehicle model. For example, two vehicles of the same model may have different hardware features for automatic braking, different computer instructions for automatic steering, and/or different artificial intelligence system versions. The current make and model rating may also not account for the extent to which another "driver," in this case the vehicle itself, is controlling the vehicle. The present embodiments may assess and price insurance risks at least in part based upon autonomous operation features that replace actions of the driver. In a way, the vehicle-related computer instructions and artificial intelligence may be viewed as a "driver."

Insurance policies, including insurance premiums, discounts, and rewards, may be updated, adjusted, and/or determined based upon hardware or software functionality, and/or hardware or software upgrades, associated with autonomous operation features. Insurance policies, including insurance premiums, discounts, etc. may also be updated, adjusted, and/or determined based upon the amount of usage and/or the type(s) of the autonomous or semi-autonomous technology employed by the vehicle. In one embodiment, performance of autonomous driving software and/or sophistication of artificial intelligence utilized in the autonomous operation features may be analyzed for each vehicle. An automobile insurance premium may be determined by evaluating how effectively the vehicle may be able to avoid and/or mitigate crashes and/or the extent to which the driver's control of the vehicle is enhanced or replaced by the vehicle's software and artificial intelligence.

When pricing a vehicle with autonomous operation features, artificial intelligence capabilities, rather than human decision making, may be evaluated to determine the relative risk of the insurance policy. This evaluation may be conducted using multiple techniques. Autonomous operation feature technology may be assessed in a test environment, in which the ability of the artificial intelligence to detect and avoid potential crashes may be demonstrated experimentally. For example, this may include a vehicle's ability to detect a slow-moving vehicle ahead and/or automatically apply the brakes to prevent a collision. Additionally, actual loss experience of the software in question may be analyzed. Vehicles with superior artificial intelligence and crash avoidance capabilities may experience lower insurance losses in real driving situations.

Results from both the test environment and/or actual insurance losses may be compared to the results of other autonomous software packages and/or vehicles lacking autonomous operation features to determine relative risk levels or risk factors for one or more autonomous operation features. To determine such risk levels or factors, the control decisions generated by autonomous operation features may be assessed to determine the degree to which actual or shadow control decisions are expected to succeed in avoiding or mitigating vehicle accidents. This risk levels or factors may be applicable to other vehicles that utilize the same or similar autonomous operation features and may, in some embodiments, be applied to vehicle utilizing similar features (such as other software versions), which may require adjustment for differences between the features.

Emerging technology, such as new iterations of artificial intelligence systems or other autonomous operation features, may be priced by combining an individual test environment assessment with actual losses corresponding to vehicles with similar autonomous operation features. The entire vehicle software and artificial intelligence evaluation process may be conducted with respect to each of various autonomous operation features. A risk level or risk factor associated with the one or more autonomous operation features of the vehicle could then be determined and applied when pricing insurance for the vehicle. In some embodiments, the driver's past loss experience and/or other driver risk characteristics may not be considered for fully autonomous vehicles, in which all driving decisions are made by the vehicle's artificial intelligence. Risks associated with the driver's operation of the vehicle may, however, be included in embodiments in which the driver controls some portion of vehicle operation in at least some circumstances.

In one embodiment, a separate portion of the automobile insurance premium may be based explicitly on the effectiveness of the autonomous operation features. An analysis of how the artificial intelligence of autonomous operation features facilitates avoiding accidents and/or mitigates the severity of accidents in order to build a database and/or model of risk assessment. After which, automobile insurance risk and/or premiums (as well as insurance discounts, rewards, and/or points) may be adjusted based upon autonomous or semi-autonomous vehicle functionality, such as by individual autonomous operation features or groups thereof. In one aspect, an evaluation may be performed of how artificial intelligence, and the usage thereof, impacts automobile accidents and/or automobile insurance claims. Such analysis may be based upon data from a plurality of autonomous vehicles operating in ordinary use, or the analysis may be based upon tests performed upon autonomous vehicles and/or autonomous operation feature test units.

The adjustments to automobile insurance rates or premiums based upon the autonomous or semi-autonomous vehicle-related functionality or technology may take into account the impact of such functionality or technology on the likelihood of a vehicle accident or collision occurring or upon the likely severity of such accident or collision. For instance, a processor may analyze historical accident information and/or test data involving vehicles having autonomous or semi-autonomous functionality. Factors that may be analyzed and/or accounted for that are related to insurance risk, accident information, or test data may include the following: (1) point of impact; (2) type of road; (3) time of day; (4) weather conditions; (5) road construction; (6) type/length of trip; (7) vehicle style; (8) level of pedestrian traffic; (9) level of vehicle congestion; (10) atypical situations (such as manual traffic signaling); (11) availability of internet connection for the vehicle; and/or other factors. These types of factors may also be weighted according to historical accident information, predicted accidents, vehicle trends, test data, and/or other considerations.

Automobile insurance premiums, rates, discounts, rewards, refunds, points, etc. may be adjusted based upon the percentage of time or vehicle usage that the vehicle is the driver, i.e., the amount of time a specific driver uses each type of autonomous operation feature. In other words, insurance premiums, discounts, rewards, etc. may be adjusted based upon the percentage of vehicle usage during which the autonomous or semi-autonomous functionality is in use. For example, automobile insurance risks, premiums, discounts, etc. for an automobile having one or more autonomous operation features may be adjusted and/or set based upon the percentage of vehicle usage that the one or more individual autonomous operation features are in use, which may include an assessment of settings used for the autonomous operation features. In some embodiments, such automobile insurance risks, premiums, discounts, etc. may be further set or adjusted based upon availability, use, or quality of Vehicle-to-Vehicle (V2V) wireless communication to a nearby vehicle also employing the same or other type(s) of autonomous communication features. In another example, automobile insurance risks, premiums, discounts, etc. for a semi-autonomous vehicle may be adjusted and/or set based upon whether recalls are completed for the vehicle.

Insurance premiums, rates, ratings, discounts, rewards, special offers, points, programs, refunds, claims, claim amounts, etc. may be adjusted for, or may otherwise take into account, the foregoing functionalities, technologies, or aspects of the autonomous operation features of vehicles, as described elsewhere herein. For instance, insurance policies may be updated based upon autonomous or semi-autonomous vehicle functionality; V2V wireless communication-based autonomous or semi-autonomous vehicle functionality; and/or vehicle-to-infrastructure or infrastructure-to-vehicle wireless communication-based autonomous or semi-autonomous vehicle functionality.

Other Matters

In some aspect, customers may opt-in to a rewards, loyalty, or other program. The customers may allow a remote server to collect sensor, telematics, vehicle, mobile device, and other types of data discussed herein. With customer permission or affirmative consent, the data collected may be analyzed to provide certain benefits to customers. For instance, insurance cost savings may be provided to lower risk or risk averse customers. Recommendations that lower risk or provide cost savings to customers may also be generated and provided to customers based upon data analysis. The other functionality discussed herein may also be provided to customers in return for them allowing collection and analysis of the types of data discussed herein.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Moreover, the systems and methods described herein are directed to an improvement to computer functionality and improve the functioning of conventional computers.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed is:

1. A computer system configured to obtain vehicle recall notifications, the computer system comprising one or more processors configured to:
   receive, in a vehicle having one or more autonomous operation features, a notification indicating that the vehicle requires a safety recall, the notification providing identification information for a vehicle part that needs to be replaced;
   determine whether the vehicle part is currently within the vehicle by obtaining a set of identification information for current vehicle parts within the vehicle and comparing the identification information for the vehicle part to the set of identification information for current vehicle parts within the vehicle, wherein the set of identification information includes a vehicle part number and is obtained by capturing images of the vehicle and analyzing text or objects within the images to identify the current vehicle parts;

in response to determining that the vehicle part is currently within the vehicle, identify a treatment facility for replacing the vehicle part and communicate a control signal to a control component of a plurality of control components of the vehicle for terminating an autonomous operation feature associated with the vehicle part; and cause the vehicle to travel to the identified treatment facility for replacing the vehicle part including control operation of the vehicle by communicating control signals to at least one control component of the plurality of control components to effect a control action of a plurality of control actions, based on one or more available autonomous operation features to travel to the identified treatment facility.

2. The computer system of claim 1, wherein the notification is received from a third-party organization different from a manufacturer of the vehicle.

3. The computer system of claim 2, wherein the notification is a first notification and wherein the one or more processors are further configured to:

transmit a second notification to the third-party organization indicating that the vehicle part has been replaced.

4. The computer system of claim 3, wherein the second notification includes identification information for a replacement vehicle part installed within the vehicle for the third-party organization to maintain an up-to-date record of the vehicle parts within the vehicle.

5. The computer system of claim 1, wherein to determine whether the vehicle part is currently within the vehicle, the one or more processors, are configured to:

obtain the set of identification information for at least one of: installed components within the vehicle, after-market components installed within the vehicle, or a type of on-board computer within the vehicle.

6. The computer system of claim 5, wherein the set of identification is further obtained from a database within the on-board computer or by communicating with the installed or after-market components within the vehicle.

* * * * *